(12) United States Patent
Nixon

(10) Patent No.: US 8,717,374 B2
(45) Date of Patent: May 6, 2014

(54) METHODS AND APPARATUS TO DISPLAY PROCESS CONTROL INFORMATION

(75) Inventor: Mark Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 900 days.

(21) Appl. No.: 12/880,887

(22) Filed: Sep. 13, 2010

(65) Prior Publication Data

US 2012/0062577 A1    Mar. 15, 2012

(51) Int. Cl.
G06T 1/00      (2006.01)
G06T 15/00     (2011.01)
G06F 15/00     (2006.01)

(52) U.S. Cl.
USPC .......................................... 345/522; 345/501

(58) Field of Classification Search
USPC ............... 702/35, 36, 38, 108, 119, 120, 122, 702/123, 182–185; 709/220–222; 345/501, 345/522
See application file for complete search history.

(56) References Cited

U.S. PATENT DOCUMENTS

| | | |
|---|---|---|
| 5,050,088 A | 9/1991 | Buckler et al. |
| 5,390,314 A | 2/1995 | Swanson |
| 5,428,525 A | 6/1995 | Cappelaere et al. |
| 5,796,602 A | 8/1998 | Wellan et al. |
| 5,801,942 A | 9/1998 | Nixon et al. |
| 5,828,851 A | 10/1998 | Nixon et al. |
| 6,256,635 B1 | 7/2001 | Arrouye et al. |
| 6,330,517 B1 | 12/2001 | Dobrowski et al. |
| 6,446,202 B1 | 9/2002 | Krivoshein et al. |
| 6,581,101 B2 | 6/2003 | Villalpando |
| 6,618,630 B1 | 9/2003 | Jundt et al. |
| 6,772,204 B1 | 8/2004 | Hansen |
| 6,948,159 B2 | 9/2005 | Born et al. |
| 6,970,771 B1 | 11/2005 | Preiss et al. |
| 7,146,230 B2 | 12/2006 | Glanzer et al. |
| 7,178,103 B2 | 2/2007 | Humphrey et al. |
| 7,213,478 B2 | 5/2007 | Harada et al. |
| 7,251,534 B2 | 7/2007 | Walls et al. |
| 7,289,861 B2 | 10/2007 | Aneweer et al. |
| 7,317,952 B2 | 1/2008 | Bhandiwad et al. |

(Continued)

FOREIGN PATENT DOCUMENTS

| | | |
|---|---|---|
| EP | 1691245 | 8/2006 |
| EP | 2 221 685 | 8/2010 |

(Continued)

OTHER PUBLICATIONS

State Intellectual Property Office, Search Report, issued for Great Britain application serial No. GB1113796.5, on Dec. 12, 2012, 4 pages.

(Continued)

Primary Examiner — Jacinta M Crawford
(74) Attorney, Agent, or Firm — Hanley, Flight & Zimmerman, LLC

(57) ABSTRACT

Example methods and apparatus to display process control information are disclosed. A disclosed example method includes receiving a request to view process control information associated with a field device, accessing, via a database, a device description file associated with the field device, wherein the device description file is formatted to conform to an Electronic Device Description Language (EDDL), and generating a display for the process control information using the device description file, wherein the device description file includes a script extension that conditionally displays a graphic if a portion of the process control information matches a condition within the script extension.

23 Claims, 11 Drawing Sheets

(56) References Cited

U.S. PATENT DOCUMENTS

| | | |
|---|---|---|
| 7,401,086 B2 | 7/2008 | Chorafakis et al. |
| 2002/0041289 A1 | 4/2002 | Hatch et al. |
| 2003/0048287 A1 | 3/2003 | Little et al. |
| 2003/0135508 A1 | 7/2003 | Chorafakis et al. |
| 2003/0208587 A1 | 11/2003 | Sauer |
| 2003/0236577 A1 | 12/2003 | Clinton |
| 2004/0059851 A1 | 3/2004 | Donaires |
| 2004/0117775 A1 | 6/2004 | Born et al. |
| 2004/0123091 A1 | 6/2004 | Das |
| 2004/0225491 A1 | 11/2004 | Chang |
| 2004/0230327 A1 | 11/2004 | Opheim et al. |
| 2004/0230582 A1 | 11/2004 | Pagnano et al. |
| 2004/0230899 A1 | 11/2004 | Pagnano et al. |
| 2004/0243933 A1 | 12/2004 | Becker et al. |
| 2005/0015176 A1 | 1/2005 | Harada et al. |
| 2005/0055681 A1 | 3/2005 | Gadre |
| 2005/0071522 A1 | 3/2005 | DeGroot |
| 2005/0071851 A1 | 3/2005 | Opheim |
| 2005/0149478 A1 | 7/2005 | Fahy |
| 2005/0172220 A1 | 8/2005 | Humphrey et al. |
| 2006/0074499 A1 | 4/2006 | Hamidpour |
| 2006/0111794 A1 | 5/2006 | Wysuph et al. |
| 2006/0190112 A1 | 8/2006 | Buesgen et al. |
| 2007/0016896 A1 | 1/2007 | Wittmer et al. |
| 2007/0067725 A1 | 3/2007 | Cahill et al. |
| 2007/0075916 A1 | 4/2007 | Bump et al. |
| 2007/0078540 A1 | 4/2007 | Bump et al. |
| 2007/0106761 A1 | 5/2007 | Beoughter et al. |
| 2007/0139441 A1 | 6/2007 | Lucas et al. |
| 2007/0157183 A1 | 7/2007 | Pazel et al. |
| 2007/0165031 A1 | 7/2007 | Gilbert et al. |
| 2007/0179645 A1 | 8/2007 | Nixon et al. |
| 2007/0244583 A1 | 10/2007 | Rachut |
| 2007/0255520 A1 | 11/2007 | Becker et al. |
| 2007/0282463 A1 | 12/2007 | Hodson et al. |
| 2008/0080395 A1 | 4/2008 | Law et al. |
| 2008/0112388 A1 | 5/2008 | Garrett et al. |
| 2008/0189441 A1 | 8/2008 | Jundt et al. |
| 2008/0234837 A1 | 9/2008 | Samudrala et al. |
| 2008/0320402 A1 | 12/2008 | Isenmann et al. |
| 2009/0077539 A1 | 3/2009 | Booth |
| 2009/0183139 A1 | 7/2009 | Foti et al. |
| 2009/0204458 A1 | 8/2009 | Wiese et al. |
| 2009/0271726 A1 | 10/2009 | Gavimath et al. |
| 2009/0276486 A1 | 11/2009 | Tandon et al. |
| 2009/0292996 A1 | 11/2009 | Anne et al. |
| 2009/0306964 A1 | 12/2009 | Bonnet et al. |
| 2010/0121999 A1 | 5/2010 | Isenmann et al. |

FOREIGN PATENT DOCUMENTS

| | | |
|---|---|---|
| GB | 2472141 | 1/2011 |
| GB | 2479036 | 9/2011 |
| JP | 2003108220 | 4/2003 |

OTHER PUBLICATIONS

Unknown Author, "Why Should You Choose EDDL: Easier Calibration," EDDL, www.eddl.org Mar. 3, 2008 (2 pages).

Rolf Birkhofer, XML for Automotion Devices, A Multi-Schema Approach, XML Europe, May 21-25, 2001 (33 pages).

Terry Blevins, "EDDL Overview," NeSSI Meeting, EDDL, Feb. 16, 2007 (69 pages).

Martin Fowler, "Language Workbenches: The Killer-App for Domain Specific Languages?" martinfowler.com; Jun. 12, 2005 (24 pages).

Karlsruhe, "Welcome to the NAMUR EDDL Workshop with ECT," EDDL, May 22, 2006 (47 pages).

"PROFIBUS Technology and Application-System Description," Oct. 2002, 42 pages.

"SIMATIC Component based Automation—Getting Started with SIMATIC iMap," published by SIEMENS, Dec. 2002, 84 pages.

UK Intellectual Property Office, "Examination Report," issued in connection with Application No. GB1002596.3, May 31, 2013, 3 pages.

Japan Intellectual Property Office, "Office Action," issued in connection with Application No. 2010-032263, Oct. 29, 2013, 2 pages.

State Intellectual Property Office of China, "Office Action," issued in connection with Application No. 201010129196.6, Sep. 23, 2013, 7 pages.

Philippines Intellectual Property Office, "Official Action," issued in connection with Application No. 12010000052, Jan. 20, 2012, 2 pages.

European Patent Office, "European Search Report," issued in connection with Application No. 10154029.2, Oct. 6, 2011, 6 pages.

UK Intellectual Property Office, "Search Report," issued in connection with Application No. GB1002596.3, Jun. 8, 2010, 4 pages.

METHODS AND APPARATUS TO DISPLAY PROCESS CONTROL INFORMATION

FIELD OF THE DISCLOSURE

The present disclosure relates generally to process control systems and, more particularly, to methods and apparatus to display process control information.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) executed by the operator workstation (e.g., a processor-based system) to enable an operator to perform desired functions with respect to the process, such as viewing the current state of the process (e.g., via a graphical user interface), evaluating the process, modifying an operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Electronic device description language (EDDL) files are commonly used within process control systems to provide a structured and/or standardized format to describe and specify functions of field devices. Process controllers and/or workstations may use EDDL files to facilitate interpretation, control and/or management of field devices. Additionally, process controllers and/or workstations may utilize EDDL files to generate graphical representations of process control information output from the field devices. In this manner, EDDL files specify a visualization of process control information based on parameters associated with field devices.

SUMMARY

Example methods and apparatus to display process control information are described. In one example, a method includes receiving a request to view process control information associated with a field device. The example method also includes accessing, via a database, a device description file associated with the field device, wherein the device description file is formatted to conform to an Electronic Device Description Language (EDDL). The example method further includes generating a display for the process control information using the device description file, wherein the device description file includes a script extension that conditionally displays a graphic if a portion of the process control information matches a condition within the script extension.

In another example, a method includes receiving information associated with a field device and determining a condition within the information that identifies when process control information from the field device is to be displayed as a graphic. Additionally, the example includes creating a script extension based on the condition to display the graphic when the process control information from the field device matches the condition. Further, the example method includes storing the script extension to a device description file associated with the field device.

An example apparatus includes an electronic device description processor to access, via a database, a device description file associated with a field device, wherein the device description file is associated with an Electronic Device Description Language (EDDL). The example apparatus also includes a graphics processor to generate a display for the process control information using the device description file and process control information received from the field device, wherein the device description file includes a script extension that instructs the graphics processor to display a graphic if a portion of the process control information matches a condition within the script extension.

DETAILED DESCRIPTION

Figure 1:
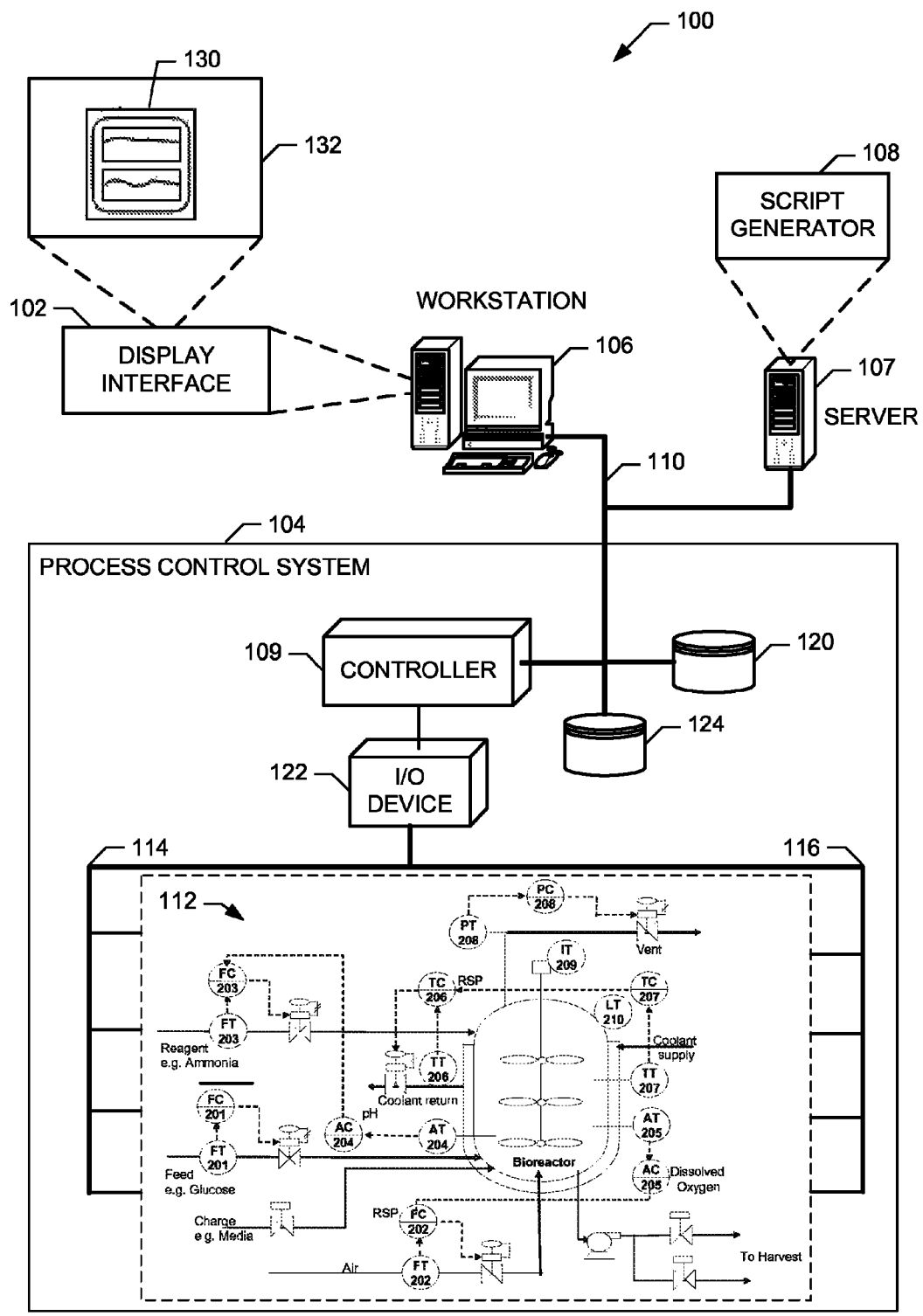
FIG. 1 shows a block diagram illustrating an example process control system including an example display interface and an example script generator.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with displaying process control information, the example method and apparatus are more generally applicable and may be implemented to display information associated with any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process control information based on data received from the field devices. The process control information may include process statistics, alarms, monitoring information, process trend information, diagnostic information, field device status information, and/or messages from the field devices.

Controllers transmit process control information to applications operating on workstations so that operators may manage the process control system. Typically, applications display process control information as at least one graphical data representation in a user interface. Data representations are helpful to operators as these data representations typically display process control information graphically in the form of charts, graphs, data tables, list boxes, graphical symbols, text, etc. The data representations and corresponding text within the user interface are generally displayed in a format and/or language associated with a locale of an operator viewing the information.

In many known systems, workstations display process control information from field devices via corresponding electronic device description (EDD) files. In many instances, the EDD files are transported to a process control environment along with a corresponding field device. In some examples, the EDD files may be included within a field device and uploaded to a process control system upon installing the field device into the process control system. In these instances, a controller may store the EDD files. Alternatively, each workstation coupled to the process control system may store a local copy of the EDD files. In other examples, process control personnel may store EDD files to a central database and access the EDD files to display process control information from a corresponding field device.

Currently, many widely used process control communication protocols support the use of EDD files conforming to an Electronic Device Description Language (EDDL) standard. These process control protocols include, for example, Foundation Fieldbus, Hart Communication Foundation, and Profibus. Further, the Field Device Integration (FDI) standard may support the use of the EDDL to create a common toolset used by process control personnel to manage field devices communicatively coupled together within control systems.

The EDDL provides a universal method of creating EDD files to access diagnostic information, status information, asset management information, and/or any other process control information associated with a field device. In this manner, EDDL may be used by process control personnel to integrate field devices with process control systems, thereby creating an interoperable environment where process control information from field devices may be accessed by workstations (e.g., processors, servers, computers, etc.) and/or handheld devices (e.g., field communicators, cell phones, smartphones, laptops, netpads, etc.). The workstations and/or the handheld devices may use the process control information in combination with EDDL formatted EDD files to configure field devices, calibrate field devices, diagnose issues associated with the field devices, and/or provide data, status information, and/or alarms for user interface displays. In this manner, the EDD files enable applications operating on workstations and/or handheld devices to display graphical representations of process control information generated by corresponding field devices.

The EDDL is a text-based language that may be used to describe characteristics, parameters, and/or functions of field devices. This functionality may include, for example, menu system descriptions, general device information, diagnostics, performance analysis information, operational statistics, parameterization information, range setup information, simulation parameters, override information, calibration trim information, monitoring information, device security protocols, and/or reset information. Manufacturers of field devices use the EDDL to create EDD files that provide a standardized form and/or structure for host workstations and/or handheld devices to access and display process control information independent of a communication protocol and/or a device operating system (e.g., Windows, Android, Blackberry OS, iOS, etc.). Through the relatively wide use of the EDDL with field devices, process control personnel may select best-in-class field devices for use in a process control system regardless of a protocol and/or type of the process control system.

Field device designers may use an EDD file to define where parameters associated with a field device are to be displayed within an application displayed via a user interface. The display information may include a type of graphical representation based on a type of parameterized process control information. EDD files may also include EDDL Methods, which is a scripting language based on a subset of American National Standards Institute (ANSI) C programming language that is used to support step-by-step field device setup, interactive field device setup, and/or calibration procedures. Using EDD files, field device manufacturers can enable process control personnel to access field devices within the full scope of the field device functionality, where all menus and parameters appear as intended by the manufacturer.

To define an EDD file, field device manufacturers may specify specific locations within an application where graphical representations of process control information from a field device are to be displayed. Further, process control personnel may edit an EDD file to reflect their preferences and/or to reflect conditions within a process control system. However, many known EDD files are static in regards to the definition and display of graphics (e.g., graphic representations of process control information). In other words, the graphics are displayed within an application regardless of the process control information because EDD files may not support conditionally displaying graphics based on the process control information.

Further, many graphics are relatively static by not enabling a user to change graphic properties (e.g., size, text, color, transparency, placement within a user interface, etc.) and/or features associated with graphics while viewing process control information. For example, an EDD file may specify that a bar chart showing a pump speed is to be displayed in a center of a user interface and the bar chart is to have a height of 3 inches. Currently, a user viewing this bar chart may be restricted by EDD files from moving the bar chart to another location within the user interface, changing the height of the bar chart, changing a color within the bar chart, etc.

The example methods and apparatus described herein implement script extensions that may be implemented within EDD files to conditionally display graphics based on process control information generated by field devices. The example script extensions may also be embedded or implanted within EDD files to enable users to modify displayed graphics by defining graphical properties and/or parameters that may be changed based on information (e.g., mouse clicks on a graphic) provided by a user.

Script extensions are instructions within an EDD file that generate a graphic to display in a user interface based on process control information from a field device matching and/or satisfying one or more conditions. For example, the example methods and apparatus described herein may utilize expressions on attributes and/or properties associated with one or more field devices as a script extension to display a graphic. The methods and apparatus described herein may also utilize event handlers as script extensions to display a graphic when a predefined event occurs within a field device. Further, the example methods and apparatus described herein may be implemented within an EDD file as a method and/or function script extension to display a value, update parameter reference(s), and/or store calculated values information based on portions of process control information from a field device matching a predefined condition.

Additionally, the example methods and apparatus described herein may utilize one or more converter script extensions to convert process control information into a graphic if a portion of the process control information generated by a field device matches a predefined condition. A script extension may also include a trigger script extension that displays a graphic when periodically changing process control information matches a condition (e.g., a threshold). In some examples, the script extensions may be defined within a composite structure of an EDD file and interact with other instructions and/or functions to display process control information.

To create the example script extensions, the example methods and apparatus described herein determine conditions within process control information that identify when graphics are to be displayed. In some examples, process control designers may define conditions based on preferences for displaying graphics. Conditions may include, for example, thresholds for displaying an indicator graphic to warn a user that some process control information from, or parameter values associated with, a field device is approaching and/or has exceeded a limit. Conditions may also include, for example, events specified within process control information that indicate a graphic is to be displayed to represent the event. In another example, conditions may include lists of conversions to change a portion of process control information into a corresponding graphic. Additionally, conditions may specify when certain parameters may be modified by a user.

The example methods and apparatus described herein may use conditions to generate script extensions within EDD files. For example, some conditions may be implemented by trigger script extensions, while other conditions may be implanted by converter and/or event handler script extensions. In other examples, conditions may be implemented by function and/or expression script extensions. In yet other examples, conditions may be implemented within script extensions using a combination of the different types of script extensions and/or other types of script extensions. Upon generating script extensions, the example methods and apparatus described herein imbed and/or include the script extension within the EDD file and store the EDD file to a database accessible by workstations and/or handheld devices.

By utilizing the example script extensions within EDD files, the example methods and apparatus described herein enable process control personnel and/or field device manufacturers to design applications that display process control information in a more comprehensive and/or complete manner. In other words, the example script extensions enable device manufacturers to provide calculations and/or functions to be executed on a workstation rather than attempting to include the calculations and/or functions within the field devices. Because workstations and/or handheld devices typically have more processing power than field devices, device manufacturers may implement, via the script extensions within EDD files, relatively more complex graphics and/or functions. Further, the example script extensions enable field device manufacturers to provide differentiation in their devices in regards to the graphical representations of the process control information utilized as tools to support and maintain the field devices.

FIG. 1 shows a block diagram of an example process control environment 100 including an example display interface 102. The example display interface 102 renders graphics for display using script extensions included within EDD files. The display interface 102 is associated with a process control system 104. Additionally, the display interface 102 may be implemented by and/or included within a workstation 106. In other examples, the display interface 102 may be included within a server, a processor, a distributed computing network, and/or any other computing device(s) that may be communicatively coupled to the workstation 106.

The illustrated example also includes a server 107 hosting a script generator 108. The script generator 108 creates script extensions within EDD files based on conditions associated with the process control system 104. While the script generator 108 is shown within the server 107, in other examples, the script generator 108 may be included within the workstation 106 and operate in parallel with the display interface 102.

The example workstation 106 and/or the example server 107 of FIG. 1 may include any computing device such as a personal computer, a laptop, a server, a controller, a personal digital assistant (PDA), a micro computer, etc. The example workstation 106 may also include any mobile computing device such as, for example, a cell phone, a smartphone, a PDA, a netpad, a field communication, etc. The workstation 106 and/or the server 107 may be implemented using any suitable computer system or processing system (e.g., the processor system P10 of FIG. 10). For example, the workstation 106 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control system 104 includes a controller 109 that may be communicatively coupled to the workstation 106 and/or the server 107 via a local area network (LAN) 110. The LAN 110 may be implemented using any communication medium and/or protocol. For example, the LAN 110 may be based on a hardwired or wireless Ethernet communication scheme. However, any other suitable communication medium and protocol could be used. Furthermore, although the LAN 110 is shown, more than one LAN and/or wireless network and appropriate communication hardware may be used to provide redundant communication paths.

The process control environment 100 may include a firewall (not shown) to provide remote workstations (e.g., workstations outside of the process control environment 100) access to EDD files and/or process control information within the process control environment 100. The process control environment 100 may also include one or more routers (not shown) to communicatively couple workstations (not shown) to the LAN 110. The routers may also communicatively couple multiple process control systems.

The process control system 104 also includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The field devices 112 receive instructions from the controller 109 via inputs 114 to execute a specified command and cause a change to the process implemented and/or controlled by the field devices 112. Furthermore, the field devices 112 measure process data, environmental data, and/or input device data and transmit the measured data via outputs 116 to the controller 109 as process control information. This process control information may include the values of variables corresponding to measured outputs from the field devices 112.

The field devices 112 may also include EDD files that are accessible by the controller 109, the server 107, and/or the workstation 106. The EDD files describe characteristics, functions, parameters, and/or features of the field devices 112. The EDD files are stored to an EDD library 120. The EDD library 120 may be implemented by Electronically Erasable Programmable Read-Only Memory (EEPROM), Random Access Memory (RAM), Read-Only Memory (ROM), and/or any other type of memory. The EDD files may be stored to the EDD library via the controller 109 and/or by process control personnel via the server 107. The workstation 106 can access the EDD library 120 for EDD files to determine how to display process control information associated with the field devices 112. Process control designers and/or engineers may use the workstation 106 and/or the script generator 108 to modify the EDD files based on display preferences and/or setup configurations of the process control system 104 and/or the field devices 112.

While the EDD library 120 is shown as being separate from the controller 109, in some process control environments the library 120 may be included within the controller 109, the workstation 106, and/or the server 107. In these examples, the controller 109 may locally access EDD files to operate a control routine and/or algorithm. Alternatively, the workstation 106 and/or the server 107 may locally access EDD files to display corresponding process control information.

The process control system 104 also includes an I/O device 122 (e.g., one or more I/O cards) to receive data from the field devices 112 and convert the data into communications capable of being processed by the example controller 109. Likewise, the I/O device 122 may convert data or communications from the controller 109 into a data format capable of being processed by the corresponding field devices 112.

The example controller 109 of FIG. 1 operates one or more control routines (e.g., process control algorithms, functions, and/or instructions) to manage the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. The example controller 109 transmits process control information (e.g., resources) to the workstation 106. The process control information transmitted by the controller 109 may include, for example, process control values, data values, alarm information, text, status information, diagnostic information, error messages, parameters, events, and/or device identifiers.

In some examples, the controller 109 may also transmit process control information from the field devices 112 to a database 124. The database 124 may be implemented by Electronically Erasable Programmable Read-Only Memory (EEPROM), Random Access Memory (RAM), Read-Only Memory (ROM), and/or any other type of memory. The process control information may be stored and/or organized based on an associated field device. For example, output values (e.g., process control information) associated with a PS101 pump speed parameter of a pump with a PUMP01 identifier may be stored within the database 124 indexed by the PUMP01 identifier and the PS101 parameters. A EDD file that references the PS101 parameter may access the database 124 to search for process control information stored in association with the PS101 parameter.

The example workstation 106 may access the example database 124 to display stored process control information. Other workstations and/or handheld devices (not shown) may also access the database 124 for process control information. In this manner, any computing device with access to the process control environment 100 may access the database 124 to graphically display process control information.

The example workstation 106 and/or other workstations with access to the process control system 104 may be configured to view, modify, and/or correct one or more processes within the process control system 104 via one or more applications. In the illustrated example, an application 130 is displayed via a user interface 132. Applications may include an enterprise view application, a graphics studio application, an explorer application, and/or any other type of process control-based application. These applications 130 display information within the workstation 106 via the user interface 132. The user interface 132 may include a graphical window (e.g., an application programming interface (API)) that may be displayed within the workstation 106 to show process control information displayed as graphical representation(s) (e.g., functional block diagrams and/or schematics). The workstation 106 may be capable of displaying more than one user interface 132 that may be communicatively coupled to the display interface 102.

In the example of FIG. 1, the script generator 108 identifies conditions within process control information from the field devices 112 and/or identifies conditions within EDD files associated with the field devices 112. The script generator 108 accesses the EDD files from the EDD library 120. The example script generator 108 creates a script extension based on the conditions and inserts and/or includes the script extension within the appropriate EDD file. The script generator 108 may then store the modified EDD file to the EDD library 120. The script generator 108 is described in further detail in conjunction with FIG. 2.

Figure 2:
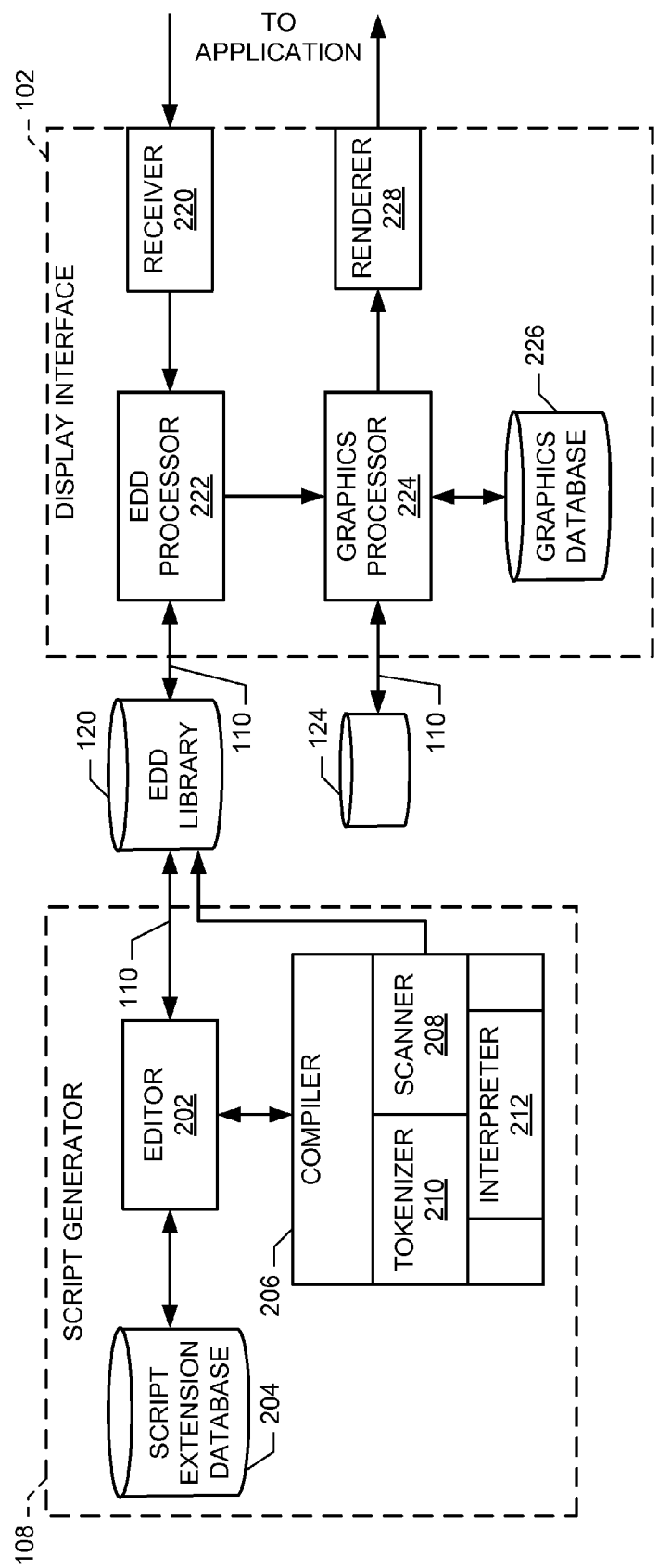
FIG. 2 shows functional block diagrams of the example display interface and the script generator of FIG. 1.

The example display interface 102 of FIG. 2 generates graphical representations of process control information from the field devices 112 based on EDD files stored within the EDD library 120. The display interface 102 transmits the graphical representations to the application 130 for display via the user interface 132. In this manner, a user of the workstation 106 may view process control information associated with the field devices 112. To display process control information, the example display interface 102 may receive a request from a user of the workstation 106 to view information associated with the field devices 112 and/or a specific field device within the process control system 104. In other examples, the display interface 102 may receive process control information from the controller 109 and identify which of the field devices 112 correspond to the information.

The example display interface 102 then accesses the EDD library 120 for EDD files associated with the requested field devices 112. The display interface 102 reads the EDD files for instructions regarding how process control information is to be displayed. In some instances, the EDD files may include instructions for displaying menu(s) as part of the application 130. The EDD files may provide descriptions of functionality for each item within the menu(s). The EDD files may also include instructions defining how graphic(s) are to be displayed within the application 130. For example, an EDD file may include instructions defining dimensions, layout, formatting, data fields, and/or placement of a table. In another example, an EDD file may include instructions defining dimensions, layout, formatting, placement, data fields, and/or placement of a graph and/or chart. In yet other example, an EDD file may link and/or reference a graphic to be displayed within the application 130.

To display a graphic within the application 130 and/or any other application, the example display interface 102 of FIG. 1 uses instructions within the EDD file to construct, format, and/or position the graphic. In some examples, the EDD file may include an instruction that specifies a certain graphic is to be displayed. The EDD file may include a reference and/or a link to a database of graphics that the display interface 102 accesses to locate the referenced graphic. In this manner, the display interface 102 may display pre-made graphics (e.g., clip art, pictures, animations, etc.) that are referenced within the EDD file. Thus, a graphic in a database may be concurrently displayed by workstations within the process control environment 100. The example display interface 102 may also render the referenced graphic with corresponding process control information for display within the application 130.

The example display interface 102 of FIG. 1 combines graphics with process control information by using references and/or links within the EDD files to process control information stored within the database 124 and/or the controller 109. For example, an EDD file describing a table graphic may include references for each of the table cells to a parameter (e.g., process control information). The reference may include a directory location within a memory, a location within a hierarchical data scheme, an Internet address of a server hosting process control information (e.g., a server associated with the OPC), and/or a location within the controller 109 specified by parameters that correspond to the process control information. The display interface 102 uses the links and/or references to insert and/or combine the process control information with graphics. The display interface 102 may then render the graphics with the process control information using instructions within EDD files to display the process control information graphically within the application 130 via the user interface 132.

In addition to implementing statically defined graphics, the example display interface 102 may read and/or execute instructions within the EDD files that include script extensions. By executing the script extensions, the display interface 102 executes conditional instructions for displaying process control information. In many instances, the workstation 106 and/or any other processor that may include the display interface 102 typically has more computing power for executing relatively complex instructions. Thus, an expression, event handler, function, method, converter and/or trigger that may consume a relatively large amount of processing bandwidth may be expressed within EDD files executed by, for example, the workstation 106, thereby reducing processing requirements of the field devices 112. For example, the display interface 102 may execute relatively complex computations, expressions, functions, and/or methods in script extensions (e.g., triple integral functions, a Bayesian statistical analysis, Analysis of Variance statistical models, etc.). By offloading processing to the workstation 106, device manufacturers can focus the processing power of the field devices 112 for measuring environmental and/or process control conditions within the process control system 104 and reporting the measured values.

By including script extensions within EDD files, the example display interface 102 enables field device designers to specify relatively complex graphics to display within the application 130 that would otherwise be impossible and/or difficult to define within instructions stored within the field devices 112. For example, the display interface 102 may execute event handlers and/or converters that specify displaying one or more graphics only if process control information from the field devices 112 matches one or more specified conditions. In other examples, the display interface 102 uses event handler script extensions to enable users of the workstation 106 to specify and/or modify how certain graphics are displayed. In yet other examples, the display interface 102 may use method script extensions to write process control information to database(s) and/or memory(s) within the process control environment 100 if a portion of the process control information matches one or more conditions. In further examples, the display interface 102 may use trigger script extensions to execute a set of instructions if a portion of the process control information changes incrementally (e.g., a timer) to match one or more conditions.

FIG. 2 shows functional block diagrams of the example display interface 102 and the script generator 108 of FIG. 1. While the EDD library 120 and the database 124 are shown external to the display interface 102 and the script generator 108, in some examples, the library 120 and/or the database 132 may be included within the display interface 102 and/or the script generator 108. In other examples, the display interface 102 and/or the script generator 108 may include local copies of the library 120 and/or the database 132.

The example script generator 108 creates EDD files including script extensions. The example script generator 108 may generate multiple EDD files concurrently or, alternatively, process EDD files in series. To create, modify, view and/or edit EDD files stored within the EDD library, the example script generator 108 includes an editor 202. The example editor 202 may function as an interface to enable a field device developer and/or process control personnel to check for syntax and/or logical errors within the EDD files. In examples where the EDD files are in an Extensible Stylesheet Language Transformation (XSLT) format and/or an Extensible Markup Language (XML) format, the editor 202 may be implemented using XMLSpy® from Altova®. In these other examples, the editor 202 may convert the EDD files from an XML and/or XSLT format into a HyperText Markup Language (HTML) file. The display interface 102 may then access HTML formatted EDD files in examples where the workstation 106 is communicatively coupled to the EDD library 120 via the Internet.

To create EDD files, the example editor 202 may access the EDD library 120 and/or the database 124 for information describing functionality of the field devices 112. In other examples, a user may utilize the editor 202 to create an EDD file based on specifications associated with the field devices 112. For example, the editor 202 may invoke a text editing application that a device designer may use to create an EDD file. In other examples, the editor 202 may be a routine and/or algorithm that generates EDD files based on the inputs 114, the outputs 116, process control information stored within the database 124, and/or any additional information associated with the field devices 112. For example, the editor 202 may identify types of outputs from a field device and create an EDD file to display outputted process control information based on the output type. In some examples, the editor 202 may be used to create an EDD file that describes features and/or functionality of one of the field devices 112. In other examples, the editor 202 may create an EDD file that describes features and/or functionality of the field devices 112 collectively and/or the process control system 104.

The example editor 202 of the illustrated example creates script extensions within EDD files. A script extension database 204 stores a library of predefined script extensions. The script extension database 204 may be implemented by Electronically Erasable Programmable Read-Only Memory (EEPROM), Random Access Memory (RAM), Read-Only Memory (ROM), and/or any other type of memory. In some examples, the script extension database 204 may store script extensions within a script architecture (e.g., the script extension architecture shown FIG. 3) and/or a composite structure (e.g., the composite structure shown in FIG. 4) that specify how script extensions are utilized based on global sets of information associated with the field devices 112. In other examples, the script extensions may be stored as a list that the editor 202 uses to select a script extension that matches one or more conditions within process control information. In the illustrated example, the script extension database 204 includes examples of script extensions including, for example, expressions, event handlers, functions, methods, converters, and/or triggers.

To create script extensions within an EDD file, the example editor 202 identifies conditions within process control information stored within the database 124 and/or features and/or functions associated with the field devices 112. The example editor 202 identifies a condition based on instances that indicate a graphic is to be displayed and/or a set of instructions is to be executed in response to some portion of process control information matching a threshold and/or a predefined event. The editor 202 may also examine syntax of the EDD files to identify conditions. For example, the editor 202 may identify conditions based on lexemes that indicate, for example, strings of letters, strings of numbers, punctuation marks, mathematical operators, etc.

Upon determining a condition, the example editor 202 of FIG. 2 accesses the script extension database 204 to match the condition to a script extension. The editor 202 may match a condition to a script extension by determining a script extension architecture and/or structure that resembles and/or includes the condition. In other examples, a user of the editor 202 may select a script extension based on an understanding of the condition. The example editor 202 then copies the selected script extension and inserts and/or includes the script extension within the EDD file(s). In this manner, the editor 202 links a portion of an EDD file to an inserted script extension. For example, the editor 202 may use names of parameters, properties, and/or attributes of process control information within a mathematical expression script extension of an EDD file to calculate a value to be displayed as a graphic.

Upon creating script extension(s) within EDD file(s), the example editor 202 transmits the EDD file(s) to a compiler 206. The example compiler 206 of FIG. 2 processes, compiles, checks, and/or translates the EDD file(s) with the script extension(s) for storage within the EDD library 120 and/or for use by the example display interface 102. The example compiler 206 includes a scanner 208 that uses any number and/or type(s) of algorithm(s), logic and/or methods to scan and/or parse EDD files to identify syntax errors, protocol errors, and/or lexemes. The scanner 208 provides the lexemes to a tokenizer 210 to convert EDD file(s) to a compressed binary format. Any errors detected by the scanner 208 may be communicated to a field device designer via the editor 202. Based on a type of error detected by the scanner 208, the example editor 202 provides tools for a field device designer to test and/or debug the detected errors. The editor 202 enables the field device designer and/or other process control personnel to edit EDD file(s) to correct any detected errors. In this manner, the example scanner 208 enables a field device designer to test and/or simulate a user interaction with EDD file(s), which may result in improved quality of the EDD file(s).

Using any number and/or type(s) of algorithm(s), logic and/or method(s), the example tokenizer 210 of FIG. 2 processes the lexemes identified by the scanner 208 to identify particular tokens (e.g., classifiable strings of input characters). For example, the scanner 208 may identify a string-of-letters lexeme representing, for example, a sentence, which the example tokenizer 210 demarcates and/or separates into one or more compressed binary words. Each token identified by the tokenizer 210 has both a value (e.g., the actual name of a variable) and a type (e.g., a variable, an operator, a number, etc.), thereby enabling the tokenizer 210 to compress EDD file(s) into a binary format. The compressed format may prevent tampering and/or subsequent processing issues by process control personnel. Because the tokenized EDD files are relatively small, tokenized files for many field devices can be stored in a limited flash memory of a handheld device and/or the workstation 106.

The example script generator 108 of FIG. 2 also includes an interpreter 212 to translate EDD file(s) into a vendor and/or system specific form. While many EDD files that support the EDDL standard are utilized by process control systems, the interpreter 212 may be used to translate some EDD files to a proprietary process control standard and/or any other standard requested by a process control manager. The script generator 108 may utilize the interpreter 212 to convert an EDD file to a format compatible with the process control system 104 and/or applications within the workstation 106. For example, the interpreter 212 may convert some EDD files to an HTML format that may be accessed by a web browser. In some examples, the interpreter 212 may translate an EDD file prior to the tokenizer 210 compressing the EDD file. In other examples, the interpreter 212 may translate compressed binary EDD files. The example interpreter 212 may use any number and/or type(s) of algorithm(s), logic and/or method(s) to translate EDD files into a corresponding specified format.

Upon scanning, tokenizing, and/or translating EDD files, the example compiler 206 of the illustrated example stores the EDD file(s) to the EDD library 120. In some examples, the compiler 206 may store multiple translated versions of the same EDD file, thereby enabling different applications associated with different formats and/or operating systems to access a compatible EDD file to display process control information. In other examples, the compiler 206 may store a compressed binary version and an uncompressed version of an EDD file, thereby enabling a user to select an EDD file based on memory constraints of a device.

The example of FIG. 2 also shows the example display interface 102, which accesses the EDD library 120 for EDD files to display process control information. In some examples, the display interface 102 may periodically access the EDD library 120 to store EDD files locally to a handheld device and/or the workstation 106. In this manner, a user may view graphics of process control information without having a device communicatively coupled to the LAN 110. In other examples, the display interface 102 accesses the EDD library 120 for EDD files any time a request to view process control information is received.

The example display interface 102 may concurrently process multiple requests to view process control information from workstations (e.g., the workstation 106). Alternatively, the example display interface 102 may process a single request to view process control information. In these alternative examples, multiple display interfaces 102 may be accessed to process multiple requests. While the example display interface 102 is described in connection with the workstation 106, the display interface 102 may operate with other workstations and/or devices that are associated with the process control environment 100 of FIG. 1.

To receive a request to view process control information graphically, the example display interface 102 includes a receiver 220. The example receiver 220 is communicatively coupled to the user interface 132 within the workstation 106. The receiver 220 receives requests from a user to view process control information via the workstation 106 and/or the user interface 132. A user selects to view process control information by entering an identifier associated with the desired information into a request and/or search field. For example, a user may enter an identifier of a field device. In another example, a user may enter an area and/or a collection of field devices within the process control system 104. In yet another example, a user may specify an identifier (e.g., a variable name) of a parameter to view process control information associated with the parameter.

A user may also specify process control information by browsing to a desired object (e.g., a listing of a field device, component, area, etc.) within a data directory. For example, a user may utilize an open function and navigate a directory to a desired field device. In yet other examples, a user may view process control information by selecting a graphical representation and/or an identifier associated with the information via the user interface 132. Alternatively, a user may enter a website address that includes and/or lists process control information. A user may then select a desired process control object listed within the displayed webpage. In some examples, a user may select multiple process control objects. In these examples, the process control objects may be included within a single request or, alternatively, multiple requests.

Upon receiving a request to view process control information, the example receiver 220 transmits the request to an EDD processor 222. The example EDD processor 222 parses the request into information to identify EDD files. The EDD processor 222 uses the information to access the EDD library 120 to search for EDD files that match the requested process control information. For example, a request for process control information may include a 'Rosemount® field device pressure sensor' type and a 'PRS02' identifier of the pressure sensor. The EDD processor 222 searches for EDD files that define functionality for a Rosemount® field device pressure sensor. The EDD processor 222 also searches EDD files that include definitions specifically for the PRS02 device. In some instances, a title and/or a file name of the EDD file may include the type and/or the identifier. In other instances, metadata associated with the EDD file may include the type and/or the identifier. In yet other instances, the EDD processor 222 may have to search text within the EDD files for a matching type and/or identifier.

After locating EDD file(s) that match requested process control information, the EDD processor 222 forwards the EDD file(s) to a graphics processor 224. The example graphics processor 224 generates a display for the requested process control information using the EDD file(s). The example graphics processor 224 also accesses the database 124 for the requested process control information. In some examples, the graphics processor 224 may use links and/or references within the EDD file(s) to locate corresponding process control information within the database 124. Additionally or alternatively, the graphics processor 224 may use identifiers and/or other information included within a request from a user to locate corresponding process control information within the database 124. In these other examples, the graphics processor 224 matches the located process control information to portions of the EDD file(s) that utilize the process control information.

The example graphics processor 224 generates graphics to display via the user interface 132 by executing instructions within the EDD file(s). The graphics processor 224 may execute instructions to determine any menu, display, and/or format information. The information may be used by the graphics processor 224 to create a display file and/or to format a template to display process control information. The menu information may also include menu functions and/or options that are available to be displayed with the user interface 132. The menu functions may include, for example, options for configuring a field device, viewing process control information generated by a field device, and/or any other information associated with the a field device.

The example graphics processor 224 also reads EDD file(s) for references to process control information processed by the controller 109 of FIG. 1. In some examples, portions of an EDD file may include a link, a file directory, and/or an identifier that corresponds to process control information. For example, the EDD file may include a pump speed data field. The EDD file may also include a link to a pump speed parameter and/or variable calculated by the controller 109. The example graphics processor 224 uses the link to request the pump speed value from the database 124 or alternatively, the controller 109. The graphics processor 224 may then insert the pump speed value into a corresponding EDD file to generate a graphical representation of the pump speed value (e.g., process control information). The graphical representation may include, for example, a gauge displaying the pump speed. In other examples, the graphics processor 224 may use links, references, data locations and/or identifiers within an EDD file to access corresponding process control information from the database 124.

The example graphics processor 224 uses EDD file(s) to generate a display file. The display file specifies, for example, locations of process control information, graphical representations of requested process information, and/or data fields. To display the process control information as one or more graphics, the graphics processor 224 uses formatting and/or graphic instructions within EDD file(s) to generate a display file. Some EDD file(s) may define attributes of, for example, a chart, graph, and/or a table that the graphic processor 224 reads to generate the described graphic. The graphics processor 224 then inserts, embeds, and/or otherwise includes corresponding process control information into properties and/or attributes of the graphic as a display file. A renderer 228 executes the display file to generate the described graphic with the corresponding process control information.

In some examples, EDD file(s) may reference a predefined graphic that is stored in a graphics database 226. In these examples, the graphics processor 224 uses a link, reference, and/or identifier to locate a corresponding graphic within the graphics database 226. The graphics processor 224 then makes a copy of the graphic and includes the graphic within the display file to be rendered by the render 228. In other examples, the graphics processor 224 may link the graphic to the display file and insert and/or embed process control information into attributes and/or properties associated with the graphic so that the renderer 228 may display the graphic with the process control information via the user interface 132.

The example graphics processor 224 also executes script extensions within the EDD file(s). The script extensions instruct the graphics processor 224 to display a graphic if a portion of the process control information matches a condition within the script extension. If the condition matches the process control information, the graphics processor 224 may access the graphics database 226 for a corresponding graphic. For example, an EDD file may include a function script extension that specifies that an alert graphic is to be displayed if an output indicates a pump speed exceeds 90% of the maximum pump speed. If a user requests to view process control information associated with the pump, the graphics processor 224 executes an EDD file associated with the pump to determine which process control information to access from the database 124. The graphics processor 224 then uses the pump speed process control information to execute a function script extension (e.g., compare the pump speed to the maximum value of 90%). If the graphics processor 224 determines the pump speed matches the condition by exceeding 90%, the graphics processor 224 uses a reference within the function script extension to a graphic within the graphic database 226 that is to be displayed. The graphics processor 224 accesses the graphic from the database 124 to include the graphic within a display file.

The example graphics processor 224 of FIG. 2 may execute an event handler within a script extension to display a graphic when a process control event specified within process control information matches a condition. Additionally, the graphics processor 224 may execute a function within a script extension to write a value to a data source when the process control information matches a condition. The graphics processor 224 may also display the written value within a graphic. In this example, the graphics processor 224 may write a value calculated via the EDD file to the database 124. In other examples, the graphics processor 224 may write the value to a memory within the workstation 106. Further, the graphics processor 224 may execute a converter within a script extension to display a graphic by changing a portion of process control information into a graphic if the portion of the process control information matches a condition. Also, the graphics processor 224 may execute a trigger within a script extension to display a graphic when a portion of process control information incrementally changes to reach a condition.

After the graphics processor 224 has created a display file by executing EDD file(s) including script extensions, the graphics processor 224 transmits the display file to the renderer 228. While the example renderer 228 is shown within the display interface 102 of FIG. 2, in other examples where the display interface 102 may be separate from a device to display process control information, the renderer 228 may be located within the device. In these examples, the graphics processor 224 transmits the display file (e.g., via the Internet and/or the LAN 110) to the renderer 228.

The example renderer 228 processes (e.g., renders) the display file into a format that is viewable by a user via, for example, the user interface 132. The example renderer 228 may generate a display based on a display size of a device (e.g., the workstation 106) that will display graphic(s) of the process control information. After rendering the display file, the example renderer 228 transmits the rendered display to the application 130 within the workstation 106 to display graphically the requested process control information.

While the example display interface 102 and the script generator 108 have been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example editor 202, the example script extension database 204, the example compiler 206, the example scanner 208, the example tokenizer 210, the example interpreter 212, the example receiver 220, the example EDD processor 222, the example graphics processor 224, the example graphics database 226, the example renderer 228 and/or, more generally, the example display interface 102 and/or the script generator 108 may be implemented by hardware, software, firmware and/or any combination of hardware, software, and/or firmware. Thus, for example, any of the example editor 202, the example script extension database 204, the example compiler 206, the example scanner 208, the example tokenizer 210, the example interpreter 212, the example receiver 220, the example EDD processor 222, the example graphics processor 224, the example graphics database 226, the example renderer 228 and/or, more generally, the example display interface 102 and/or the script generator 108 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example editor 202, the example script extension database 204, the example compiler 206, the example scanner 208, the example tokenizer 210, the example interpreter 212, the example receiver 220, the example EDD processor 222, the example graphics processor 224, the example graphics database 226, and/or the example renderer 228 are hereby expressly defined to include a computer readable medium such as a memory, DVD, CD, etc. storing the software and/or firmware. Further still, the example display interface 102 and/or the script generator 108 may include one or more elements, processes and/or devices in addition to, or instead of, those illustrated in FIG. 2, and/or may include more than one of any or all of the illustrated elements, processes and devices.

Figure 3:
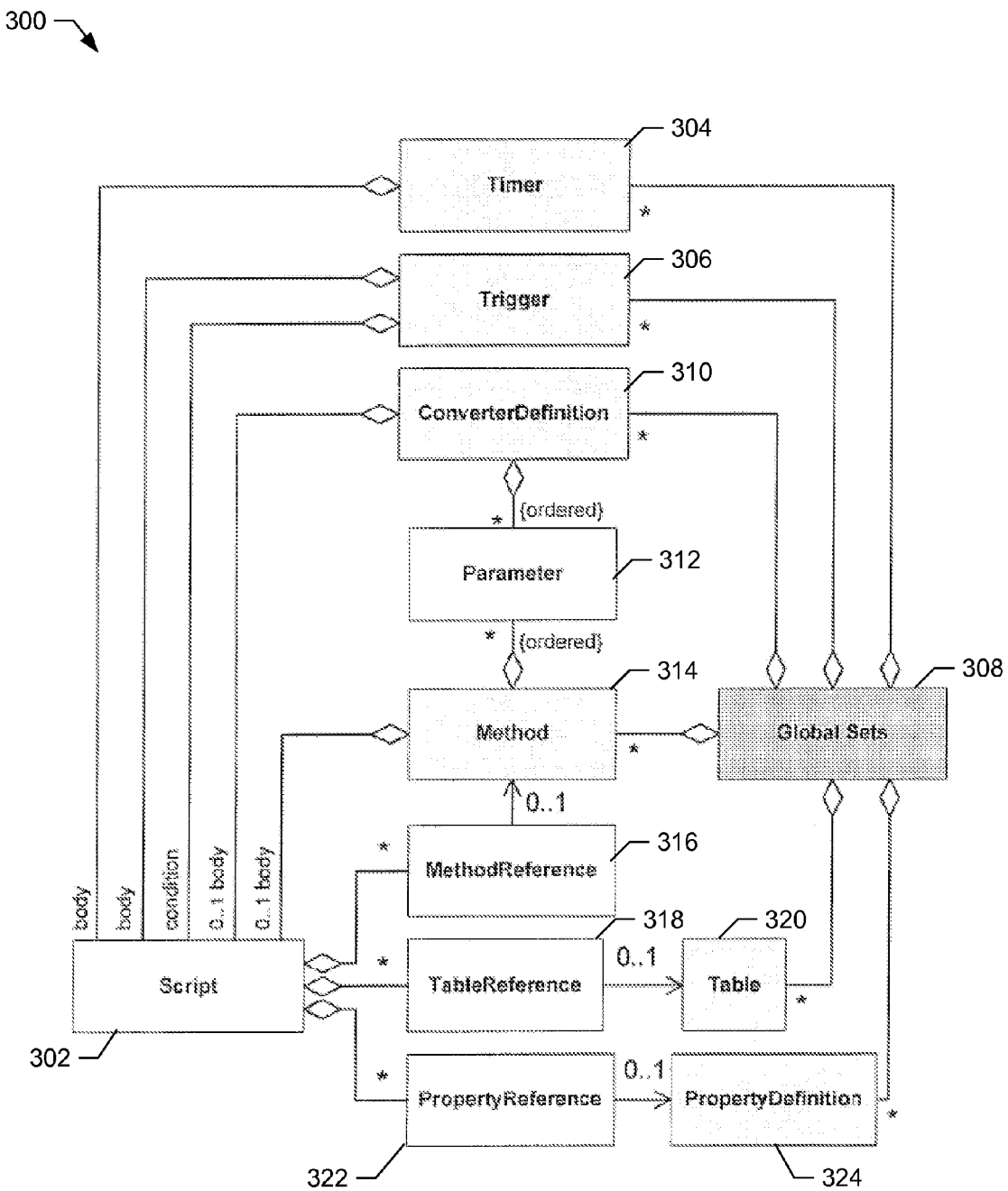
FIG. 3 shows a diagram of an example script extension architecture within an EDD file that may be processed by the example display interface of FIG. 1.

FIG. 3 shows a diagram of an example script extension architecture 300 associated with an EDD file that may be processed by the example display interface 102 of FIG. 1. While FIG. 3 shows the script extension architecture 300, other examples may include architectures for different types and/or combinations of script extensions. The example script extension architecture 300 may represent a portion of an EDD file that has been created by the script generator 108 and stored to the EDD library 120. The example display interface 102 may access the script extension architecture 300 to execute one or more script extensions to determine if graphics of process control information are to be displayed within the user interface 132.

The example script extension architecture 300 includes a script body 302. The script body 302 includes instructions that link script extensions, variables, parameters, and/or attributes. In this example, the script body 302 is linked to a timer 304, which includes a set of instructions that cause a processor to periodically increment a value of a variable. The example script body 302 of the illustrated example uses the timer 304 in conjunction with a trigger script extension 306. The example trigger script extension 306 uses a value from the timer 304 to determine when to display a graphic. The timer 304 and the trigger script extension 306 are coupled to a global sets library 308 that defines features, characteristics, and/or functionality of a field device associated with the script extension architecture 300. In this example, the timer 304 and/or the trigger script extension 306 may be linked to parameters associated with inputs, outputs and/or other variables reported by the field device and specified within the global sets library 308. For example, a script to generate a graphic based on the trigger script extension 306 may reference a definition of a graphic specified within the global sets library 308.

The example script extension architecture 300 includes a converter script extension 310 that converts a parameter 312 into a graphical representation that is specified within the global sets library 308. The example parameter 312 is calculated within the script extension architecture 300 by a method script extension 314, which is referenced by a method reference 316 linked to the script body 302. The method reference 316 may be a pointer to the method script extension 314 that enables multiple instances within the script body 302 to execute the method script extension 314.

In a similar manner, multiple instances within the script body 302 may point to a table reference 318 to access a table 320 that lists values of variables and/or attributes specified within the global sets library 308. Additionally, multiple instances of the script body 302 may point to a property reference 322 to access a property definition 324 that references one or more variables and/or attributes specified within the global sets library 308.

Figure 4:
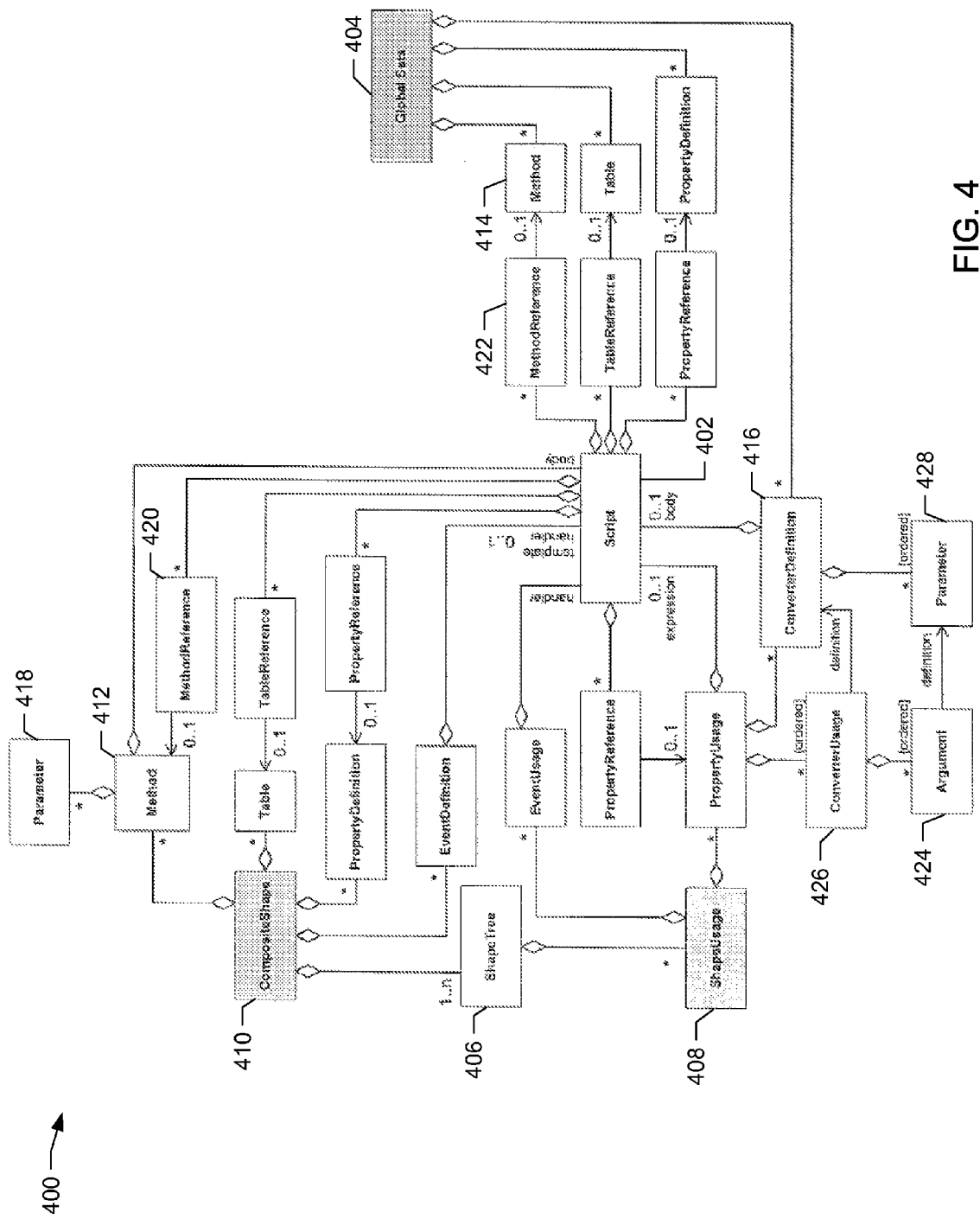
FIG. 4 shows a diagram of an example composite structure of script extensions within an EDD file that may be processed by the example display interface of FIG. 1.

FIG. 4 shows a diagram of an example composite structure 400 of script extensions within an EDD file that may be processed by the example display interface 102 of FIG. 1. While FIG. 4 shows the composite structure 400, other examples may include structures for different types and/or combinations of script extensions. The example composite structure 400 may represent a portion of an EDD file that has been created by the script generator 108 and stored to the EDD library 120. The example display interface 102 may access the composite structure 400 to execute one or more script extensions to determine if graphics of process control information are to be displayed within the user interface 132.

Similar to the script extension architecture 300 of FIG. 3, the composite structure 400 includes a script body 402 and a global sets library 404 for implementing an EDD file for a field device. The composite structure 400 also includes a shape tree block 406 that defines and/or specifies graphics. In contrast, the script extension architecture 300 may define and/or specify graphics within the script body 302. A shape usage block 408 defines which graphics within the shape tree block 406 are to be displayed based on conditions (e.g., Event Usage and Property Usage) within script extensions. Additionally, a composite shape block 410 may define how graphics within the shape tree block 406 are to be displayed. In other examples, the composite structure 400 may reference graphics stored within, for example, the graphics database 226.

The example composite structure 400 of the illustrated example includes a first method script extension 412, a second method script extension 414, and a converter script extension 416. The first method script extension 412 displays a graphic based on a value of a first parameter 418. A method reference block 420 enables multiple instances within the script body 402 to point to the first method script extension 412. Likewise, a method reference block 422 enables multiple instances within the script body 402 to point to the second method script extension 414, which may access information associated with the field device from the global sets library 404. The example converter script extension 416 determines when a graphic is to be displayed based on an argument block 424 and a converter usage instance 426 (e.g., a condition) matching a portion of process control information represented by a parameter 428.

Figure 5:
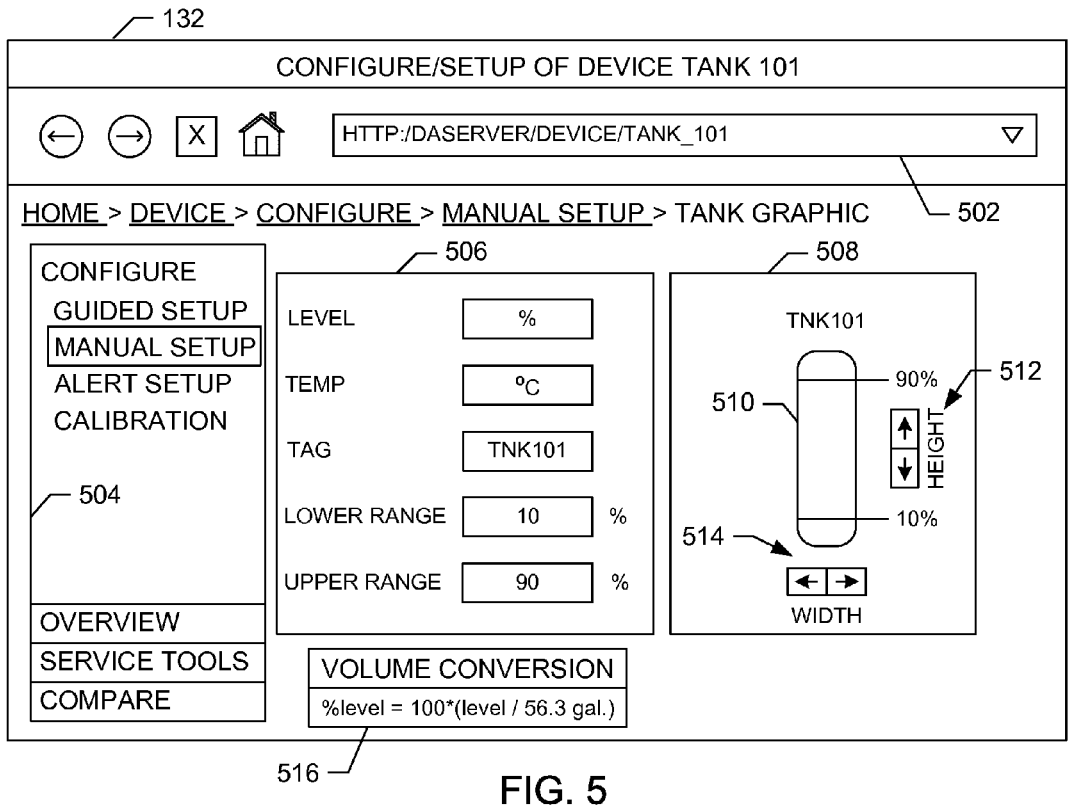
FIGS. 5-7 show an example user interface displaying graphics generated by the example display interface of FIGS. 1 and 2 based on conditions within script extensions.
Figure 6:
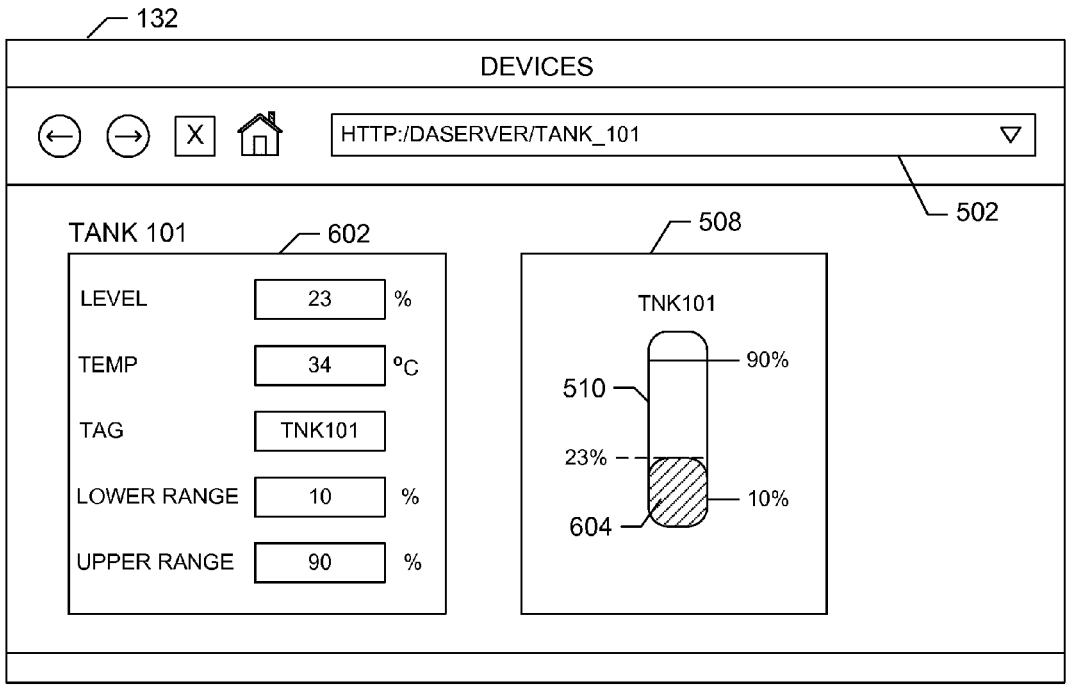
Figure 7:
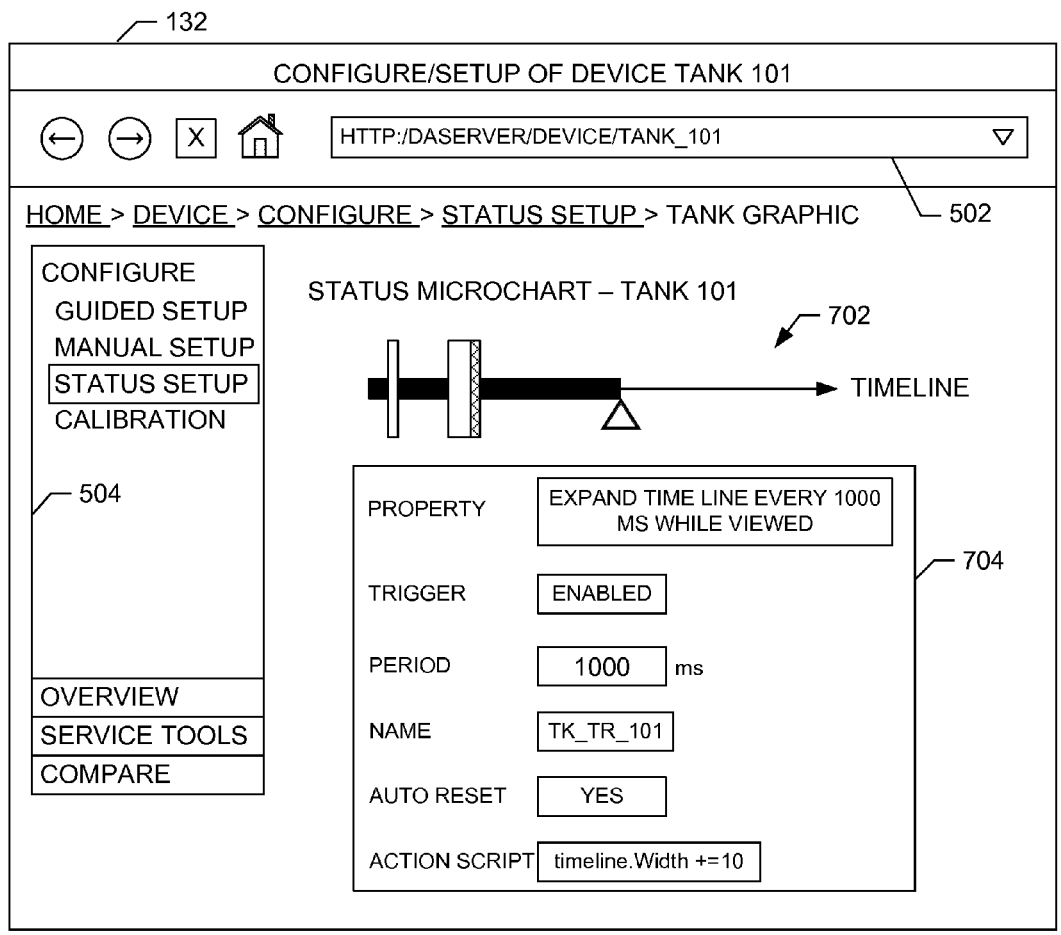

FIGS. 5-7 show the example user interface 132 displaying graphics generated by the example display interface 102 of FIGS. 1 and 2 based on conditions within script extensions. The user interface 132 displays process control information associated with a Tank 101 field device in a browser application. The user interface 132 in FIG. 5 includes a navigation bar 502 that a user may use to enter a network address and/or an Internet address to view process control information. In this example, a user enters an address of 'DAserver/Device/Tank_101. In response to the address, the example display interface 102 identifies the 'Tank 101' as an identifier and locates an associated EDD file. The EDD file may have been generated by the script generator 108 based on information associated with the Tank 101 field device. In this example, the Tank 101 field device is a storage tank that stores a fluid within the process control system 104 of FIG. 1. The EDD file may include instructions that cause the display interface 102 to generate a menu panel 504 with options to configure and/or manage the Tank 101 field device. The Tank 101 field device may be included within the field devices 112 of FIG. 1.

In this example, a user selects a 'Manual Setup' option within the menu panel 504. In response to the 'Manual Setup' option being selected, the display interface 102 determines from the EDD file that a parameter panel 506 and a graphic panel 508 are to be displayed. The 'Manual Setup' option enables a user to specify how process control information from the Tank 101 field device is to be graphically displayed. The parameter panel 506 includes a Level parameter that enables a user to select a unit type within a data field for displaying a level of the Tank 101 field device. The parameter panel 506 also includes a Temperature parameter (e.g., Temp) that enables a user to select a unit type for displaying a temperature of a fluid within the Tank 101 field device. Further, the parameter panel 506 includes a Tag parameter that enables a user to enter an identification value for the Tank 101 field device. Further, the parameter panel 506 includes a Lower Range and an Upper Range parameter that enable a user to specify when an alert is to be displayed based on a fluid level within the Tank 101 field device.

The graphic panel 508 includes a preview of a tank graphic 510 based on the parameters within the parameter panel 506. For example, the tank graphic 510 includes the Upper Range parameter of 90% and the Lower Range Parameter of 10%. The graphic panel 508 also includes a height adjuster 512 and a width adjuster 514 that are associated with an event handler script extension. For example, the event handler script extension may include the instructions:

```
Button 1_Click(Object sender, MouseClickArgs args)
{
    if(args.Button == Button.Left)
    {
        this.Width -= 10;
    }
    else if (args.Button == Button.Right)
    {
        this.Width += 10;
    }
}
```

The instructions indicate that if the left button (e.g., Button.Left) of the width adjuster 514 is selected, the display interface 102 is to decrease the width of the graphic 510 by 10 units (e.g., this.Width-=10). Similarly, the display interface can increase the width of the graphic 510 by 10 units each time the right button of the width adjuster 514 is selected. In this manner, the event handler script extension enables the example display interface 102 to adjust (e.g., modify) the graphic 510 based on information from a user without changing the EDD file. In other words, the event handler script extension within the EDD file changes a display of the graphic 510 based on a user selecting a width and/or a height that match conditions for changing the display of the graphic 510.

The example user interface 132 also includes a conversion panel 516 that includes a calculation of a percentage of the level of the Tank 101 field device (e.g., % level=100*(level/56.3 gal.). In some examples, the calculation may be entered by a user. In other examples, the EDD file associated with the Tank 101 field device may include the calculation. The conversion panel 516 shows an example of an expression script extension via the calculation. For example, the calculation includes a level parameter divided by a number (e.g., level/56.3). The resulting value is then multiplied by 100. In this manner, the expression script extension calculates a percentage of a level of the Tank 101 field device instead of the Tank 101 field device transmitting a percentage value, thereby reducing the amount of data processing within the Tank 101 field device. While the calculation shown within the conversion panel 516 is relatively simple, other EDD files may include expressions that are relatively complex (e.g., recursive algebraic feedback functions) that require the process power associated with the display interface 102.

FIG. 6 shows the user interface 132 displaying process control information associated with the Tank 101 device. The example display interface 102 executes the EDD file associated with the Tank 101 field device to display graphically the process control information. For example, the display interface 102 displays a parameter panel 602 that is specified by a user via the parameter panel 506 in FIG. 5. The example parameter panel 602 of FIG. 6 shows a percentage of a level (e.g., Level) of the Tank 101 field device based on values reported by the device. The parameter panel 602 also includes a temperature of a fluid reported by the Tank 101 field device.

The user interface 132 also includes the graphic panel 508 of FIG. 5 showing the graphic 510. The example display interface 102 may use the level of the Tank 101 field device (e.g., 23%) as process control information to match to conditions within a function script extension and a converter script extension. A function script extension may include, for example, the instructions:

```
void update TankLevel( float level)
{
    if (level < 0) level = 0;
    if (level > 99.9) level = 99.9;
    'DVRt:float//TNK101/LEVEL.CV' = level;
}
```

These instructions of the function script extension cause the display processor 102 to show the graphic 510 as having a level of 0% if the reported level is less than 0 and show the graphic 510 as having a level of 99.9% if the reported level from the Tank 101 field device is greater than 99.9. In this manner, the level process control information reported by the Tank 101 field device is compared to conditions (e.g., less than 0 and greater than 99.9) to determine which level to show within the graphic 510. In other examples, the function may include an action of displaying a different graphic if the level is less than 0 or if the level is greater than 99.9. Additionally, the function script extension includes an instruction (e.g., 'DVRt:float//TNK101/LEVEL.CV'=level;) that causes the display interface 102 to write the level of the Tank 101 field device to a parameter at a directory and/or memory location. The EDD file may also include an instruction (not shown) within the function script extension that causes the display interface 102 to show the level of the Tank 101 field device within the graphic 510 (e.g., the 23% line).

The example graphic 510 may also be associated with a converter script extension within the EDD file associated with the Tank 101 field device. For example, the converter script extension may include the instructions:

```
Color levelToPercentColor (float value)
{
    if (level < 10.0) return Color.red;
    if (level > 90.0) return Color.red;
    return Color.green;
}
```

These instructions cause the display interface 102 to compare the level process control information generated by the Tank 101 field device to conditions (e.g., less than 10.0 or greater than 90.0). In this example, the conditions may have been specified by a user entering a value within the Lower Range parameter and the Upper Range Parameter of the parameter panel 506 of FIG. 5. Based on the converter script extension, if the reported level of the Tank 101 field device is below 10% or greater than 90%, the display interface 102 shows a bar 604 in a red color depicting the level of the Tank 101 field device. Otherwise, the display interface 102 is to show the bar 604 in a green color. In this manner, the display interface 102 converts the level process control information into a color of the bar 604. In other relatively more complex examples, a converter script extension may instruct the display interface 102 to display a type of alarm graphic adjacent to the graphic 510 within the graphic panel 508 to indicate the level of the Tank 101 field device matches a condition (e.g., equal to or greater than 90% or equal to or less than 10%). In these examples, the instructions may include a link to a graphic within the graphics database 226 of FIG. 2.

FIG. 7 shows the user interface 132 graphically displaying process control information associated with the Tank 101 field device within a microchart graphic 702. In this example, a user selects a 'Status Setup' menu item within the menu panel 504, thereby causing the display interface 102 to execute portions of the EDD file that describe displaying information to enable a user to setup a graphical display of the status of the Tank 101 field device (e.g., the microchart graphic 702). The graphical display includes a trigger parameter table 704 that enables a user to specify conditions for a trigger script extension. In this manner, a user may enter values within the trigger parameter table 704 to cause the display interface 102 to modify the microchart graphic 702 without the user modifying instructions within the EDD file.

The example trigger parameter table 704 includes a Property parameter that describes a purpose of the trigger script extension. The trigger script extension described by the parameters within the trigger parameter table 704 extends the Timeline of the microchart 702 every 1000 milliseconds (ms). A Trigger parameter indicates if the trigger script extension is enabled when a user views the microchart graphic 702. A Period parameter specifies a time when an event occurs that is defined within an Action Script parameter. A name parameter enables a user to provide an identification value of the trigger script extension.

Further, An Auto Reset parameter enables a user to select if the trigger script extension resets upon a value specified within the Period parameter reaching a threshold. The Action Script parameter specifies how the microchart graphic 702 is changed upon the expiration of a value specified within the Period parameter. In this example, the Timeline of the microchart graphic 702 is increased by 10 units. In this manner, the microchart graphic 702 is changed by the display interface 102 upon the incremental increase of a timer reaching (e.g., matching) 1000 ms. The Timeline may be extended by the display interface 102 executing the EDD file to show additional status information periodically reported by the Tank 101 field device.

Flowcharts representative of example processes 800 and 900 for implementing the display interface 102 and/or the script generator 108 of FIGS. 1 and 2 are shown in FIGS. 8A, 8B, 9A, and 9B. In this example, the processes 800 and 900 may be implemented using machine readable instructions in the form of a program for execution by a processor such as the processor P12 shown in the example processor system P10 discussed below in connection with FIG. 10. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 8A, 8B, 9A, and 9B, many other methods of implementing the example display interface 102 and/or the script generator 108 may alternatively be used. For example, the order of execution of the blocks may be changed, and/or some of the blocks described may be changed, eliminated, or combined.

As mentioned above, the example processes of FIGS. 8A, 8B, 9A, and 9B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8A, 8B, 9A, and 9B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

Figure 8A:
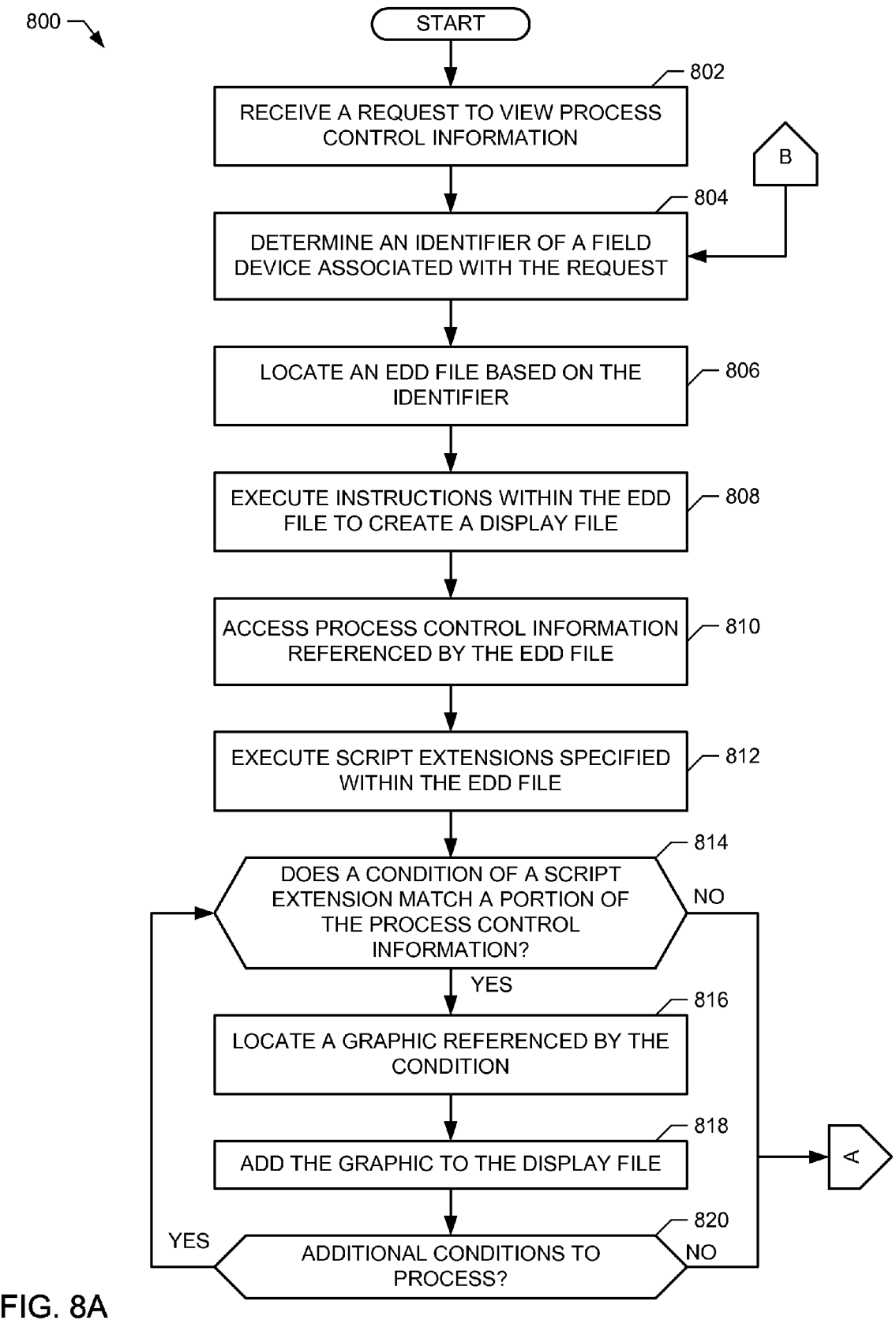
FIGS. 8A, 8B, 9A, and 9B are flowcharts of example processes that may be used to implement the example display interface and/or the script generator of FIGS. 1 and/or 2.
Figure 8B:
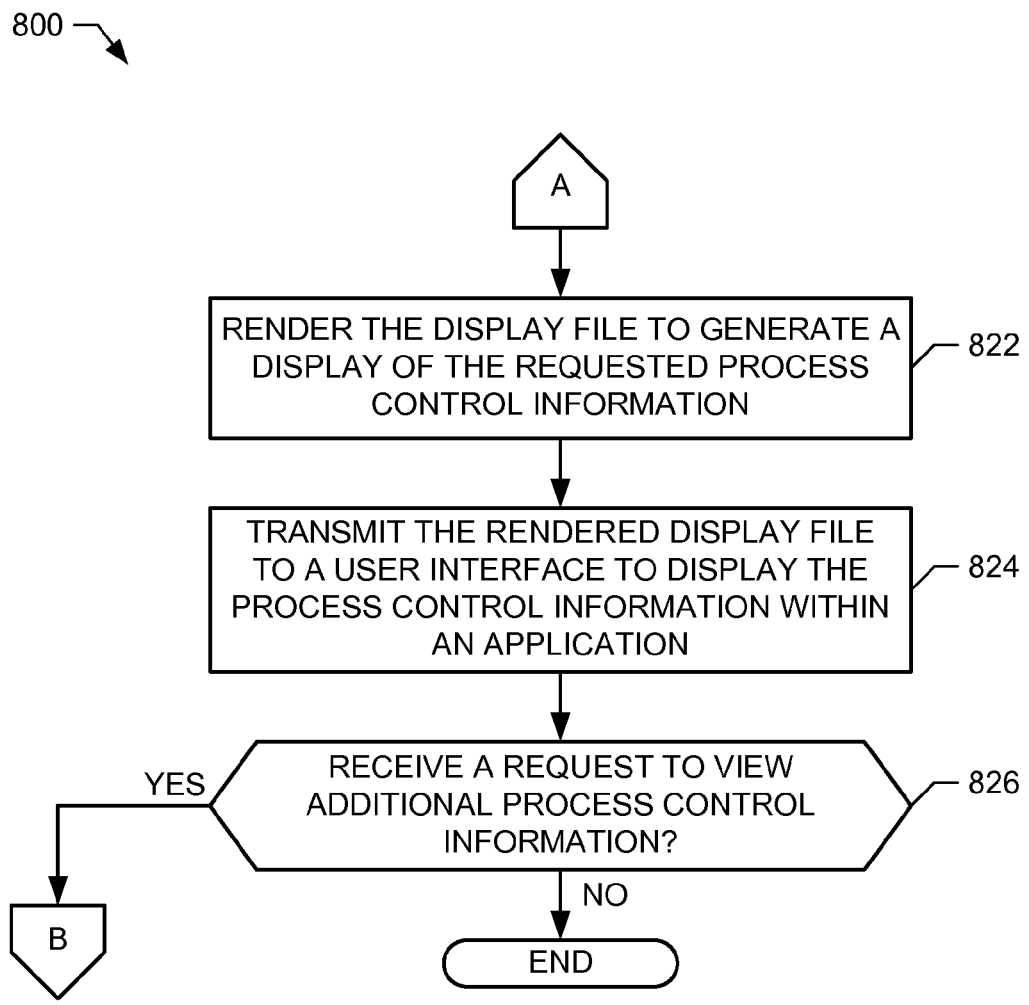

The example process 800 of FIGS. 8A and 8B displays graphics based on process control information requested by a user. The example process 800 of FIG. 8A begins by receiving a request to view process control information (e.g., via the receiver 220 of FIG. 2) (block 802). The request may include an identifier of field devices, components, areas within a process control environment and/or any other identification of process control information. The example process 800 then determines at least one identifier of, for example, a field device included and/or associated with the request (e.g., via the EDD processor 222) (block 804). The example process 800 uses the identifier(s) to locate at least one EDD file stored within, for example, the EDD library 120 (e.g., via the EDD processor 222) (block 806).

The example process 800 then executes instructions within the selected EDD file(s) to create a display file (e.g., via the graphics processor 224) (block 808). Executing the instructions may include determining menu functionality, information for displaying menus and/or other graphics, and/or any other display and/or processing information associated with the field devices. The example process 800 also uses the instructions to access process control information stored, for example, within the database 124 (e.g., via the graphics processor 224). For example, some instructions within an EDD file may reference and/or link to process control information generated by the field device.

The example process 800 also executes script extensions within the EDD file(s) (e.g., via the graphics processor 224) (block 812). The example process 800 may execute expression script extensions, which perform calculations and/or comparisons of values, attributes, and/or properties within the process control information. The example process 800 may also execute event handler script extensions that instruct the process 800 to display a graphic if a process control event is detected. Additionally, the example process 800 may execute function and/or method script extensions, converter script extensions, trigger script extensions, and/or any other type of script extensions. While executing the script extensions, the example process 800 determines if a condition specified by a script extension matches a portion of process control information referenced within the condition (e.g., via the graphics processor 224) (block 814). In other words, the example process 800 determines if a portion of the process control information specified by a variable, a parameter, an attribute and/or a reference within a script extension matches and/or exceeds a threshold and/or a specified event (e.g., a condition).

If the example process 800 determines that a condition matches a portion of the process control information, the example process 800 locates at least one graphic referenced by and/or included within the condition (e.g., via the graphics processor 224) (block 816). The example process 800 may, for example, access the graphic database 226 to search for the referenced graphic(s). The example process 800 then adds the graphic to the display file with the corresponding process control information (e.g., via the graphics processor 224) (block 818). Adding the graphic may include providing a reference to a location of a graphic within the graphic database 226 in the display file and/or copying information describing the graphic and inserting the copied information into the display file. The example process 800 then determines if there are additional conditions to process within other script extensions (e.g., via the graphics processor 224) (block 820). If there are additional conditions to process, the example process 800 returns to block 814 and determines if one of the remaining conditions matches a portion of referenced process control information.

However, if there are no additional conditions to process, the example process 800 of FIG. 8B continues by rendering the display file to generate a display of the requested process control information (e.g., via the renderer 228) (block 822). Also, if none of the conditions match a portion of process control information (block 814), the example process executes block 822. The example process 800 may render the display file by creating and/or generating displayable graphics using characteristics defined within the EDD file(s) and/or the graphics database 226 and inserting process control information into corresponding parameters, variables, and/or attribute specified by the graphics.

The example process 800 then transmits the rendered display file to a user interface (e.g., the user interface 132 of FIG. 1) to display the process control information graphically within an application (e.g., the application 130) (e.g., via the renderer 228) (block 824). The example process 800 may then determine if another request to view additional process control information has been received (e.g., via the receiver 220) (block 826). If another request has been received, the example process 800 returns to block 804 of FIG. 8A and determines at least one identifier included within the request. The example process 800 may continue checking for requests until a user ceases use of the display interface 102. Alternatively, the example process 800 may terminate if no additional requests are detected.

Figure 9A:
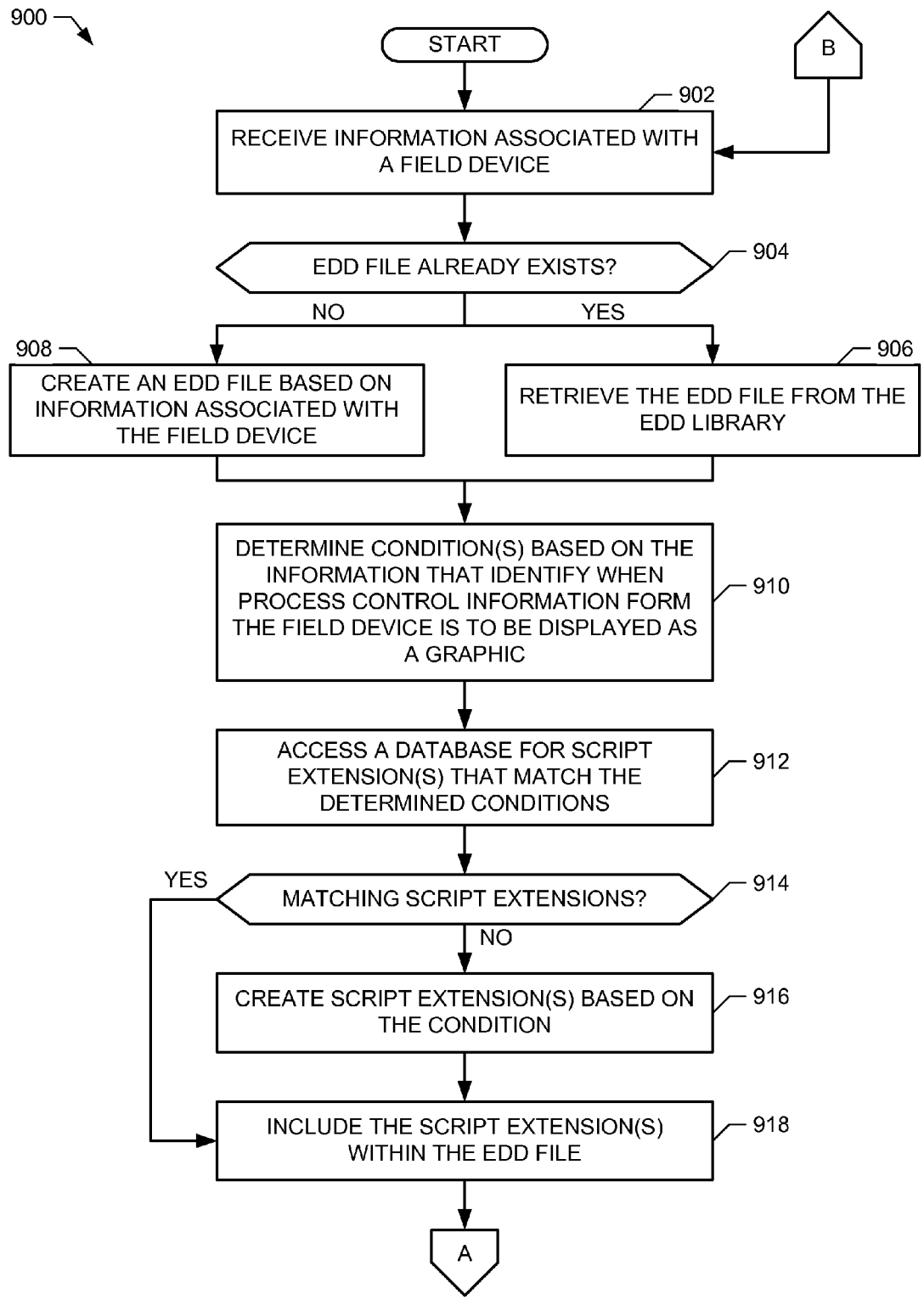
Figure 9B:
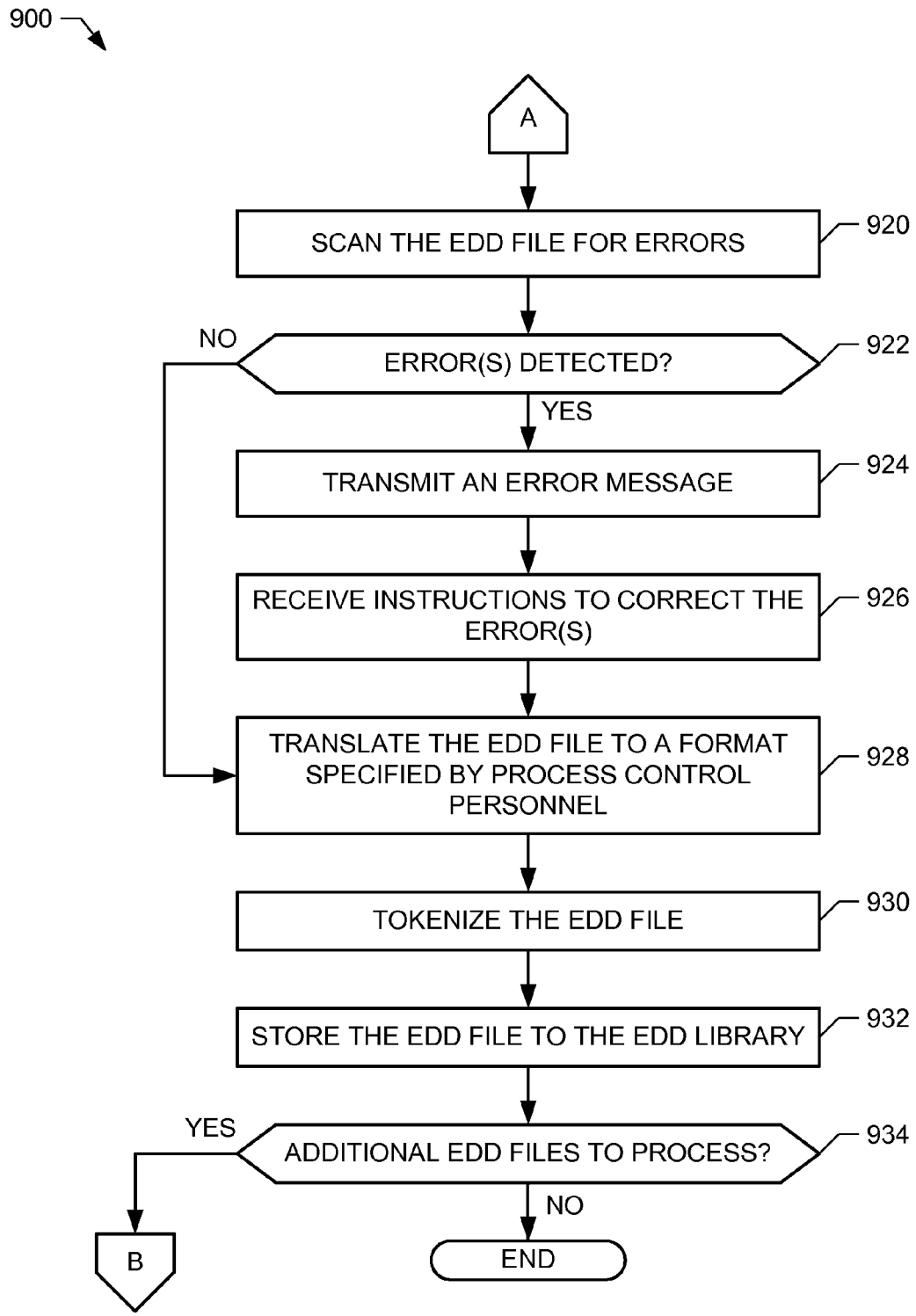

The example process 900 of FIGS. 9A and 9B generates EDD files based on information associated with at least one field device. The example process 900 of FIG. 9A begins by receiving information associated with a field device (e.g., via the editor 202 of FIG. 2) (block 902). The information may include process control information generated by the field device and stored, for example, within the database 124. The information may also include specifications from a manufacturer of the field device and/or any information stored within the field device. The example process 900 then determines if an EDD file exists for the field device by accessing, for example, the EDD library 120 and searching for the EDD file (e.g., via the editor 202) (block 904). The example process 900 may determine an EDD file exists by checking the EDD library 120 for any EDD files that match the field device. In some examples, the EDD file may be stored within the field device and be received by the example process 900.

If an EDD file exists for the field device, the example process 900 retrieves the EDD file from the EDD library 120 (e.g., via the editor 202) (block 906). However, if an EDD file does not exist, the example process 900 creates an EDD file based on the received information (e.g., via the editor 202) (block 908). In some examples, a process control designer and/or a field device designer may create the EDD file based on a specification associated with the field device. In other examples, the process 900 may generate the EDD file using the information as a guide as to how process control information and/or menu items are to be graphically displayed.

After creating or retrieving the EDD file (block 906 or 908), the example process 900 continues by determining condition(s) based on the information that identify when process control information associated with the field device is to be displayed as a graphic (e.g., via the editor 202) (block 910). The example process 900 then accesses a database (e.g., the script extension database 210) for script extension(s) that match the determined conditions (e.g., via the editor 202) (block 912). The script extension database 204 may include any number and/or types of script extensions that the example process 900 may search including, for example, expressions, functions, methods, triggers, converts, and/or event handlers. The example process 900 may match a condition to a script extension by comparing the types and/or relationships between variables, attributes, and/or parameters of the condition to types and/or relationships between variables, attributes, and/or parameters within the script extensions.

If none of the script extensions within the script extension database 204 match any of the condition(s) (block 914), the example process 900 creates script extension(s) for each of the unmatched conditions (e.g., via the editor 202) (block 916). The example process 900 may create a script extension by transforming a condition into one or more executable instructions that include a comparison to one or more variables, attributes and/or parameters identifying some process control information. The example process 900 may also create a script extension by determining a graphic that is to be displayed if process control information matches a condition. Alternatively, a script extension may be specified and/or created by a user. The example process 900 then includes the script extension(s) within the EDD file. Further, for any script extensions that match the conditions (block 914), the example process 900 includes the matching script extensions from the script extension database 204 within the EDD file.

The example process 900 of FIG. 9B continues by compiling the EDD file with the script extensions by scanning the EDD file for errors (e.g., via the scanner 208) (block 920). If at least one error is detected (block 922), the example process 900 transmits an error message reporting the error to a user (e.g., via the editor 202) (block 924). The example process 900 then receives instructions to correct the error(s) (e.g., via the editor 202) (block 926). The example process 900 corrects the errors and translates the EDD file into a format and/or standard specified by process control personnel to be in compliance with a process control system (e.g., via the interpreter 212) (block 928). In some examples, the EDD file may not be translated. In these examples, block 928 may be skipped by the example process 900.

The example process 900 may next tokenize the EDD file into a compressed binary format (e.g., via the tokenizer 210) (block 930). The example process 900 may then store the EDD file and/or the tokenized EDD file to, for example, the EDD library 120 (e.g., via the compiler 206) (block 932). In other examples, the process 900 may transmit the EDD file to a device such as, for example, the workstation 106 of FIG. 1. The example process 900 also determines if script extensions are to be added to additional EDD files (e.g., via the editor 202) (block 934). If there are additional EDD files, the example process 900 of FIG. 9A returns to block 902 and receives information associated with a field device to retrieve and/or create the EDD files. If there are no additional EDD files to process, the example process 900 terminates.

Figure 10:
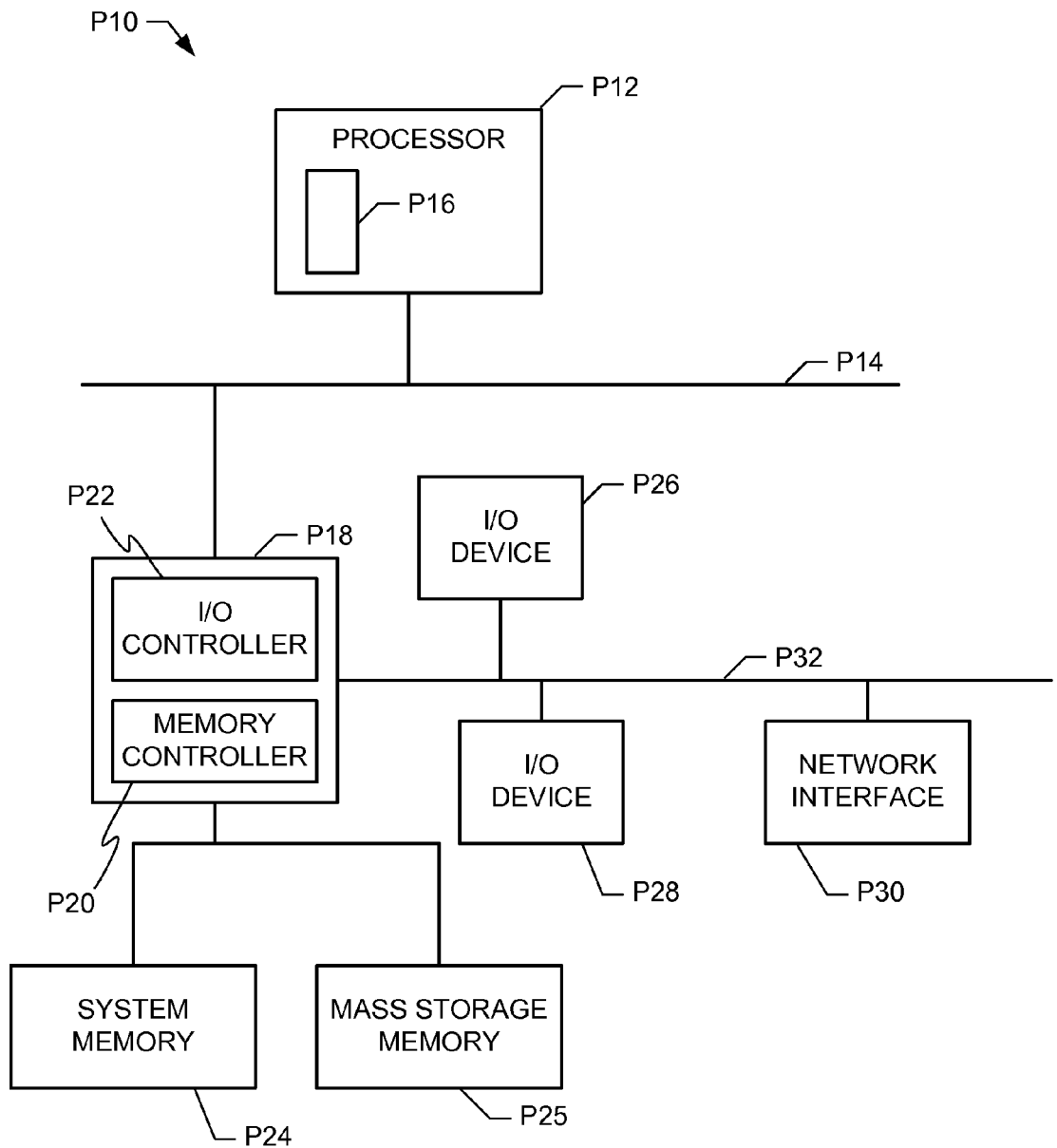
FIG. 10 is a block diagram of an example processor system that may be used to implement the example methods and apparatus described herein.

FIG. 10 is a block diagram of an example processor system P10 that may be used to implement the example methods and apparatus described herein. For example, processor systems similar or identical to the example processor system P10 may be used to implement the example editor 202, the example script extension database 204, the example compiler 206, the example scanner 208, the example tokenizer 210, the example interpreter 212, the example receiver 220, the example EDD processor 222, the example graphics processor 224, the example graphics database 226, the example renderer 228 and/or, more generally, the example display interface 102 and/or the script generator 108 of FIGS. 1 and/or 2. Although the example processor system P10 is described below as including a plurality of peripherals, interfaces, chips, memories, etc., one or more of those elements may be omitted from other example processor systems used to implement one or more of the example editor 202, the example script extension database 204, the example compiler 206, the example scanner 208, the example tokenizer 210, the example interpreter 212, the example receiver 220, the example EDD processor 222, the example graphics processor 224, the example graphics database 226, the example renderer 228 and/or, more generally, the example display interface 102 and/or the script generator 108.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the example script extension database 204 and/or the example graphics database 226 (FIGS. 1 and 2), the mass storage memory P25 may include a hard disk drive, an optical drive, a tape storage device, etc. Alternatively, if the example processor system P10 is used to implement the script extension database 204 and/or the graphics database 226, the mass storage memory P25 may include a solid-state memory (e.g., a flash memory, a RAM memory, etc.), a magnetic memory (e.g., a hard drive), or any other memory suitable for mass storage in the script extension database 204 and/or the graphics database 226.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 10 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display process control information, the method comprising:
    receiving a request to view process control information associated with a field device;
    accessing, via a database, a device description file associated with the field device, wherein the device description file is formatted to conform to an Electronic Device Description Language (EDDL); and generating a display for the process control information using the device description file, wherein the device description file includes a script extension that conditionally displays a graphic if a portion of the process control information matches a condition within the script extension.

2. A method as defined in claim 1, wherein the script extension is an event handler that displays the graphic when a process control event matches the condition.

3. A method as defined in claim 1, wherein the script extension is a function that displays the graphic as a value when the portion of the process control information matches the condition.

4. A method as defined in claim 1, wherein the script extension is a function that writes a value to a data source when the portion of the process control information matches the condition.

5. A method as defined in claim 1, wherein the script extension is an expression that performs at least one mathematical operation on the portion of the process control information.

6. A method as defined in claim 1, wherein the script extension is a converter that displays the graphic by changing the portion of the process control information into the graphic if the portion of the process control information matches the condition.

7. A method as defined in claim 1, wherein the script extension is a trigger that displays the graphic when the portion of the process control information incrementally changes to match the condition.

8. A method as defined in claim 1, wherein generating the display includes:
   determining the condition that matches the process control information;
   selecting the graphic based on the condition;
   associating the portion of the process control information with the graphic; and
   rendering the graphic for display, the rendering including displaying the portion of the process control information within the graphic.

9. A method as defined in claim 1, wherein the script extension is a composite structure that displays the graphic if the condition matches the portion of the process control information.

10. An apparatus to display process control information, the apparatus comprising:
    an electronic device description processor to access, via a database, a device description file associated with a field device, wherein the device description file is associated with an Electronic Device Description Language (EDDL); and
    a graphics processor to generate a display for the process control information using the device description file and the process control information received from the field device, wherein the device description file includes a script extension that instructs the graphics processor to display a graphic if a portion of the process control information matches a condition within the script extension.

11. An apparatus as defined in claim 10, further comprising a receiver to receive a request to view the process control information.

12. An apparatus as defined in claim 10, wherein the graphics processor is to execute the script extension to determine if the graphic is to be displayed.

13. An apparatus as defined in claim 10, wherein the graphics processor is to execute an event handler within the script extension to display the graphic when a process control event specified within the process control information matches the condition.

14. An apparatus as defined in claim 10, wherein the graphics processor is to execute a function within the script extension to write a value to a data source when the portion of the process control information matches the condition and to display the written value within the graphic.

15. An apparatus as defined in claim 10, wherein the graphics processor is to execute a converter within the script extension to display the graphic by changing the portion of the process control information into the graphic if the portion of the process control information matches the condition.

16. An apparatus as defined in claim 10, wherein the graphics processor is to execute a trigger within the script extension to display the graphic when the portion of the process control information incrementally changes to reach the condition.

17. An apparatus as defined in claim 10, wherein the graphics processor is to generate the display by:
    determining if the condition matches the portion of the process control information;
    selecting the graphic based on the condition; and
    associating the portion of the process control information with the selected graphic.

18. An apparatus as defined in claim 17, further comprising a renderer to render the graphic for display via a user interface.

19. A tangible computer readable medium having instructions stored thereon that, when executed, cause a machine to at least:
    receive a request to view process control information transmitted from a field device;
    access, via a database, a device description file associated with the field device, wherein the device description file is formatted to conform to an Electronic Device Description Language (EDDL); and
    generate a display for the process control information using the device description file, wherein the device description file includes a script extension that conditionally displays a graphic if a portion of the process control information matches a condition within the script extension.

20. A method to create a script extension within a device description file, the method comprising:
    receiving information associated with a field device;
    determining a condition within the information that identifies when process control information from the field device is to be displayed as a graphic;
    creating a script extension based on the condition to display the graphic when the process control information from the field device matches the condition; and
    storing the script extension to a device description file associated with the field device.

21. A method as defined in claim 20, wherein creating the script extension includes:
    selecting at least one of a trigger, a converter, a function, an expression, or an event handler based on a type of the condition; and
    generating the script extension including the at least one of the trigger, converter, the function, the expression, or the event handler.

22. A method as defined in claim 20, wherein creating the script extension includes:

processing the device description file including the script extension by compressing the device description file to a binary format; and transmitting the compressed device description file to at least one of a memory of a workstation or a handheld device.

23. A method as defined in claim 20, wherein creating the script extension includes:

analyzing the device description file to identify syntax errors;

simulating a user interface with the device description file; and translating the script extension into a system specific format based on the field device.

* * * * *